US012644749B2

(12) United States Patent
Bestic et al.

(10) Patent No.: US 12,644,749 B2
(45) Date of Patent: Jun. 2, 2026

(54) FLUID MONITORING MODULE ARRANGEMENTS

(71) Applicant: Swagelok Company, Solon, OH (US)

(72) Inventors: Michael D. Bestic, Sagamore Hills, OH (US); David J. Hasak, Concord, OH (US); Bryan S. Reiger, Willowick, OH (US); Andrew Creque, Macedonia, OH (US); Marius O. Stroescu, Mayfield Hts., OH (US); William Michael Ponikvar, Sagamore Hills, OH (US); Cal R. Brown, Lyndhurst, OH (US); Matthew R. Dixon, Parma, OH (US); Joshua Webb, Stow, OH (US); Theodore J. Gausman, Lyndhurst, OH (US); Michael Whisler, Southington, OH (US); Randy Rieken, Littleton, CO (US); Robert Bianco, Columbia Station, OH (US); Andrew P. Marshall, University Heights, OH (US)

(73) Assignee: SWAGELOK COMPANY, Solon, OH (US)

( * ) Notice: Subject to any disclaimer, the term of this patent is extended or adjusted under 35 U.S.C. 154(b) by 344 days.

(21) Appl. No.: 18/453,643

(22) Filed: Aug. 22, 2023

(65) Prior Publication Data

US 2023/0392965 A1 Dec. 7, 2023

Related U.S. Application Data

(63) Continuation of application No. 17/124,968, filed on Dec. 17, 2020, now Pat. No. 11,781,894, which is a
(Continued)

(51) Int. Cl.
| | | |
|---|---|---|
| *G01F 15/18* | (2006.01) | |
| *G01F 1/36* | (2006.01) | |
| *G01F 1/40* | (2006.01) | |

(52) U.S. Cl.
CPC ............ *G01F 15/185* (2013.01); *G01F 1/363* (2013.01); *G01F 1/40* (2013.01)

(58) Field of Classification Search
CPC ...... G01F 1/34–48; G01F 15/00; G01F 15/14; G01F 15/18; G01F 15/185; G01F 1/84–8495
See application file for complete search history.

(56) References Cited

U.S. PATENT DOCUMENTS

| | | | |
|---|---|---|---|
| 4,153,083 A | 5/1979 | Imler | |
| 4,576,204 A | 3/1986 | Smallhorn | |
| | (Continued) | | |

FOREIGN PATENT DOCUMENTS

| | | |
|---|---|---|
| CN | 1606721 A | 4/2005 |
| CN | 1969185 | 5/2007 |
| | (Continued) | |

OTHER PUBLICATIONS

International Search Report and Written Opinion from PCT/US2019/051375 dated Jan. 27, 2020.
(Continued)

*Primary Examiner* — Justin N Olamit
(74) *Attorney, Agent, or Firm* — Calfee, Halter & Griswold LLP

(57) ABSTRACT

A fluid monitoring module includes an enclosure, a fluid sensing device assembled with the enclosure, and a controller disposed within the enclosure. The fluid sensing device includes a body member defining a fluid port external to the enclosure and a male threaded sensor port mounted to the enclosure and extending laterally into the enclosure, a
(Continued)

female threaded nut assembled with the sensor port, a fluid sensor seated against a counterbore portion of the sensor port, and a retaining collar having a neck portion extending into the sensor port in engagement with the fluid sensor and a head portion captured between the female threaded nut and an end face of the sensor port. The controller is in circuit communication with the fluid sensor for receiving at least one of pressure indicating signals and temperature indicating signals from the fluid sensor, and for measuring fluid data based on the received signals.

21 Claims, 33 Drawing Sheets

Related U.S. Application Data continuation of application No. 16/573,289, filed on Sep. 17, 2019, now Pat. No. 10,890,474.

(60) Provisional application No. 62/895,115, filed on Sep. 3, 2019, provisional application No. 62/844,390, filed on May 7, 2019, provisional application No. 62/844,399, filed on May 7, 2019, provisional application No. 62/844,383, filed on May 7, 2019, provisional application No. 62/775,066, filed on Dec. 4, 2018, provisional application No. 62/732,848, filed on Sep. 18, 2018.

(56) References Cited

U.S. PATENT DOCUMENTS

| | | | | |
|---|---|---|---|---|
| 4,735,094 | A | * | 4/1988 | Marsh .................... G01F 1/3209 |
| | | | | 73/861.24 |
| 4,930,357 | A | | 6/1990 | Thurston |
| 5,088,774 | A | | 2/1992 | Spiegelman |
| 5,174,765 | A | | 12/1992 | Williams |
| 5,295,790 | A | | 3/1994 | Bossart |
| 5,303,731 | A | | 4/1994 | Vavra |
| 5,361,676 | A | | 11/1994 | Gibbs |
| 5,415,065 | A | | 5/1995 | McMills |
| 5,454,945 | A | | 10/1995 | Spearman |
| 5,469,749 | A | | 11/1995 | Shimada |
| 5,535,629 | A | * | 7/1996 | Gerdes .................... G01L 19/14 |
| | | | | 73/756 |
| 5,535,633 | A | | 7/1996 | Kofoed |
| 5,576,498 | A | | 11/1996 | Shambayati |
| 5,672,832 | A | | 9/1997 | Cucci |
| 5,750,892 | A | | 5/1998 | Huang |
| 5,893,354 | A | | 4/1999 | Detweiler |
| 6,436,720 | B1 | | 8/2002 | Oberbeck |
| 6,502,323 | B2 | * | 1/2003 | Williams ................ F16L 19/00 |
| | | | | 33/645 |
| 6,539,968 | B1 | | 4/2003 | White |
| 6,561,010 | B2 | | 5/2003 | Wilson |
| 6,609,431 | B1 | | 8/2003 | Tietsworth |
| 6,813,964 | B1 | | 11/2004 | Clark |
| 6,843,139 | B2 | | 1/2005 | Schumacher |
| 7,096,738 | B2 | | 8/2006 | Schumacher |
| 7,447,599 | B2 | | 11/2008 | Ellender |
| 7,546,777 | B2 | * | 6/2009 | Bitto .................... G01F 1/8477 |
| | | | | 73/861.355 |
| 7,726,202 | B2 | * | 6/2010 | Nakao .................... G01F 1/8472 |
| | | | | 73/861.355 |
| 7,729,869 | B2 | | 6/2010 | Brown |
| 7,740,024 | B2 | | 6/2010 | Brodeur |
| 7,775,126 | B2 | | 8/2010 | Eckhardt |
| 7,784,361 | B2 | | 8/2010 | Wiedmann |
| 7,891,256 | B2 | | 2/2011 | Ushigusa |
| 7,942,069 | B2 | | 5/2011 | Peterson |
| 8,006,572 | B2 | | 8/2011 | Igarashi |
| 8,082,946 | B2 | | 12/2011 | Laverdiere |
| 8,281,669 | B2 | | 10/2012 | Ertl |

| | | | | |
|---|---|---|---|---|
| 8,281,817 | B2 | | 10/2012 | Tinker |
| 8,297,478 | B2 | | 10/2012 | Hughes |
| 8,376,312 | B2 | | 2/2013 | Mudd |
| 8,418,549 | B2 | | 4/2013 | Speldrich |
| 8,656,772 | B2 | | 2/2014 | Qasimi |
| 8,718,954 | B2 | | 5/2014 | vonBlumenthal |
| 8,746,057 | B2 | | 6/2014 | Yasuda |
| 8,826,731 | B2 | | 9/2014 | Speldrich |
| 9,494,947 | B2 | | 11/2016 | Hirata |
| 9,562,796 | B2 | | 2/2017 | Lull |
| 9,683,429 | B2 | | 6/2017 | Mathiesen |
| 9,752,486 | B2 | | 9/2017 | Yang |
| 10,087,943 | B2 | | 10/2018 | Taketomi |
| 11,852,517 | B2 | * | 12/2023 | Cunningham ........ G01F 1/8409 |
| 2001/0032674 | A1 | | 10/2001 | Brunet |
| 2002/0002425 | A1 | | 1/2002 | Dossey |
| 2003/0061888 | A1 | | 4/2003 | Gould |
| 2004/0083807 | A1 | | 5/2004 | Mudd |
| 2004/0177703 | A1 | | 9/2004 | Schumacher |
| 2005/0160754 | A1 | | 7/2005 | Hugh |
| 2006/0010989 | A1 | | 1/2006 | Clark |
| 2006/0266128 | A1 | | 11/2006 | Clark |
| 2007/0017303 | A1 | | 1/2007 | Fujiwara |
| 2007/0151366 | A1 | | 7/2007 | McDonald |
| 2008/0250854 | A1 | | 10/2008 | Ding |
| 2009/0157040 | A1 | | 6/2009 | Jacobson |
| 2009/0221986 | A1 | | 9/2009 | Wang |
| 2009/0229377 | A1 | | 9/2009 | Yoshihiro et al. |
| 2013/0247995 | A1 | | 9/2013 | Erlich |
| 2014/0116217 | A1 | | 5/2014 | Hashish et al. |
| 2016/0076909 | A1 | | 3/2016 | Kicpera |
| 2016/0160640 | A1 | | 6/2016 | Graves |
| 2016/0290967 | A1 | | 10/2016 | Tanaka |
| 2017/0060143 | A1 | | 3/2017 | Ding et al. |
| 2017/0292864 | A1 | | 10/2017 | Zhang |
| 2018/0246533 | A1 | | 8/2018 | Somani |
| 2019/0321815 | A1 | | 10/2019 | Schmid |

FOREIGN PATENT DOCUMENTS

| | | |
|---|---|---|
| CN | 203117796 | 8/2013 |
| CN | 107076589 A | 8/2017 |
| EP | 1369672 | 7/2009 |
| EP | 980507 | 7/2011 |
| EP | 2703787 | 9/2015 |
| EP | 2787329 | 2/2017 |
| EP | 3272129 B1 | 8/2020 |
| GB | 2150039 | 1/1988 |
| JP | 49130260 S | 12/1974 |
| JP | S62-163741 | 10/1987 |
| JP | H05-149812 | 6/1993 |
| JP | 07-146164 A | 6/1995 |
| JP | H07146164 A | 6/1995 |
| JP | H09-166512 | 6/1997 |
| JP | 2000-510575 A | 8/2000 |
| JP | 2001-523998 | 11/2001 |
| JP | 3244849 | 1/2002 |
| JP | 2004157719 | 6/2004 |
| JP | 2004361208 A | 12/2004 |
| JP | 2005537464 | 12/2005 |
| JP | 2007-034667 A | 2/2007 |
| JP | 2007078383 A | 3/2007 |
| JP | 2007248320 | 9/2007 |
| JP | 2010532452 | 10/2010 |
| JP | 2010532452 A | 10/2010 |
| KR | 1855746 | 6/2018 |
| WO | 2017049782 | 3/2017 |

OTHER PUBLICATIONS

International Search Report and Written Opinion from PCT/US2019/051618 dated Jan. 27, 2020.

Communication from European Application No. 19779322.7 dated Jul. 21, 2022.

Office action from Japanese Application No. 2021-512531 dated Oct. 31, 2023.

Office action from Taiwanese Application No. 108133417 dated Nov. 22, 2023.

(56)          References Cited

OTHER PUBLICATIONS

Office action from Chinese Application No. 201980057364.4 dated
Mar. 6, 2024.
Office action from Japanese Application No. 2025-003961 dated
Feb. 3, 2026.

\* cited by examiner

648a

640a

643a

644a

645a

641a

615a

649a

FLUID MONITORING MODULE ARRANGEMENTS

CROSS-REFERENCE TO RELATED APPLICATIONS

This application is a continuation of U.S. patent application Ser. No. 17/124,968, filed on Dec. 17, 2020, for FLUID MONITORING MODULE ARRANGEMENTS, which is a continuation of U.S. patent application Ser. No. 16/573,289, filed on Sep. 17, 2019, for FLUID MONITORING MOD-ULE ARRANGEMENTS, now U.S. Pat. No. 10,890,474, issued on Jan. 12, 2021, which claims the benefit of each of U.S. Provisional Patent Application Ser. No. 62/732,848, filed on Sep. 18, 2018 and entitled LAMINAR FLOW ELEMENT, U.S. Provisional Patent Application Ser. No. 62/775,066, filed on Dec. 4, 2018 and entitled FLOW SENSING MODULE, U.S. Provisional Patent Application Ser. No. 62/844,383, filed on May 7, 2019 and entitled FLUID MONITORING MODULE ARRANGEMENTS, U.S. Provisional Patent Application Ser. No. 62/844,390, filed on May 7, 2019 and entitled FLUID MONITORING MODULE ARRANGEMENTS, U.S. Provisional Patent Application Ser. No. 62/844,399, filed on May 7, 2019 and entitled FLUID MONITORING MODULE ARRANGE-MENTS, and U.S. Provisional Patent Application Ser. No. 62/895,115, filed on Sep. 3, 2019 and entitled FLUID MONITORING MODULE ARRANGEMENTS, the entire disclosures of each of the above being incorporated herein by reference.

BACKGROUND

Laminar flow elements (or LFEs) are generally used to measure the flow of gases, for example, for use with mass flowmeters or other such monitoring devices. A conventional laminar flow element operates by producing a differential pressure that is proportional to the velocity of the gas passing through a section of the laminar flow element, which is specifically configured to maintain the gas flow in a laminar state. Upstream and downstream pressure sensors detect this pressure differential, which is used to calculate the flow rate. Due to the typical length-to-diameter requirements of the restricting flow path of a laminar flow element (e.g., a 25:1 ratio), large size, intricate machining, or complex assembly requirements often result in increased manufacturing costs, extensive lead times, and/or undesirably large LFE components.

SUMMARY

According to an aspect of the present disclosure, a flow sensing device includes a first body member defining an inlet port, an upstream sensor port, and a first connecting port; a second body member defining an outlet port, a downstream sensor port, and a second connecting port; a flow restricting element defining a flow restricting passage and including a first end connection coupled to the first connecting port and a second end connection coupled to the second connecting port, such that the flow restricting pas-sage is disposed between the inlet port and the outlet port, and between the upstream sensor port and the downstream sensor port; a first fluid sensor assembled with the upstream sensor port; and a second fluid sensor assembled with the downstream sensor port.

According to another aspect of the present disclosure, a fluid monitoring module includes a flow sensing device and a controller. The flow sensing device includes a first body member defining an inlet port, an upstream sensor port, and a first connecting port; a second body member defining an outlet port, a downstream sensor port, and a second con-necting port; a flow restricting element defining a flow restricting passage and including a first end connection coupled to the first connecting port and a second end connection coupled to the second connecting port, such that the flow restricting passage is disposed between the inlet port and the outlet port, and between the upstream sensor port and the downstream sensor port; a first fluid sensor assembled with the upstream sensor port; and a second fluid sensor assembled with the downstream sensor port. The controller is in circuit communication with the first and second fluid sensors for receiving at least one of pressure indicating signals and temperature indicating signals from each of the first and second fluid sensors, and for measuring fluid data based on the received signals.

According to another aspect of the present disclosure, a fluid monitoring module includes an enclosure, a fluid sensing device assembled with the enclosure, and a control-ler disposed within the enclosure. The fluid sensing device includes a first body member defining a first end port, a first sensor port, and a first connecting port; a second body member defining a second end port, a second sensor port, and a second connecting port; a first fluid sensor assembled with the first sensor port; and a second fluid sensor assembled with the second sensor port. The controller is in circuit communication with the first and second fluid sensors for receiving at least one of pressure indicating signals and temperature indicating signals from each of the first and second fluid sensors, and for measuring fluid data based on the received signals. The first end port, the second end port, the first connecting port, and the second connecting port are external to the enclosure.

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION

Figure 1:
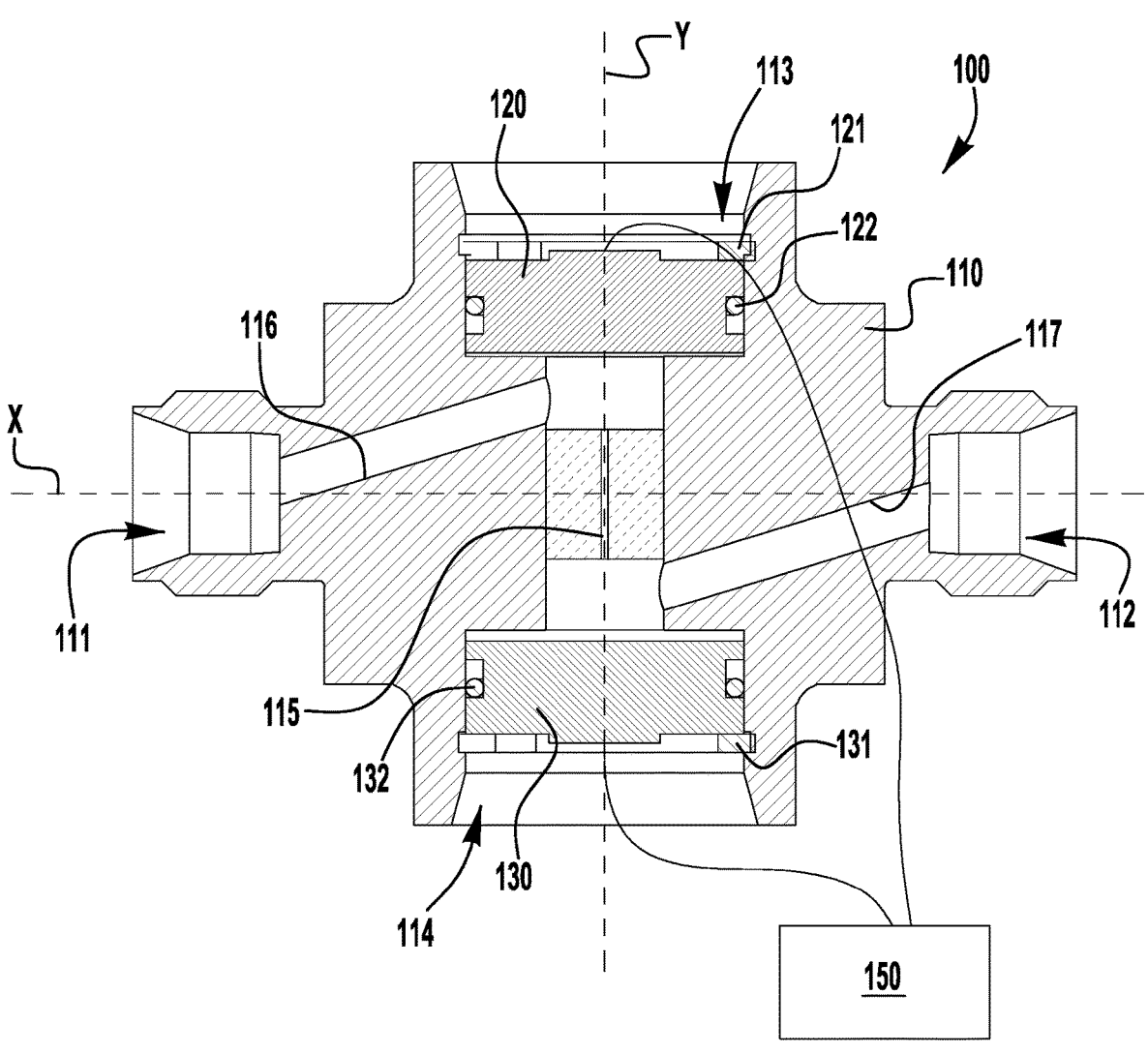
FIG. 1 is a cross-sectional view of an exemplary flow sensing device, in accordance with an aspect of the present disclosure.
Figure 1A:
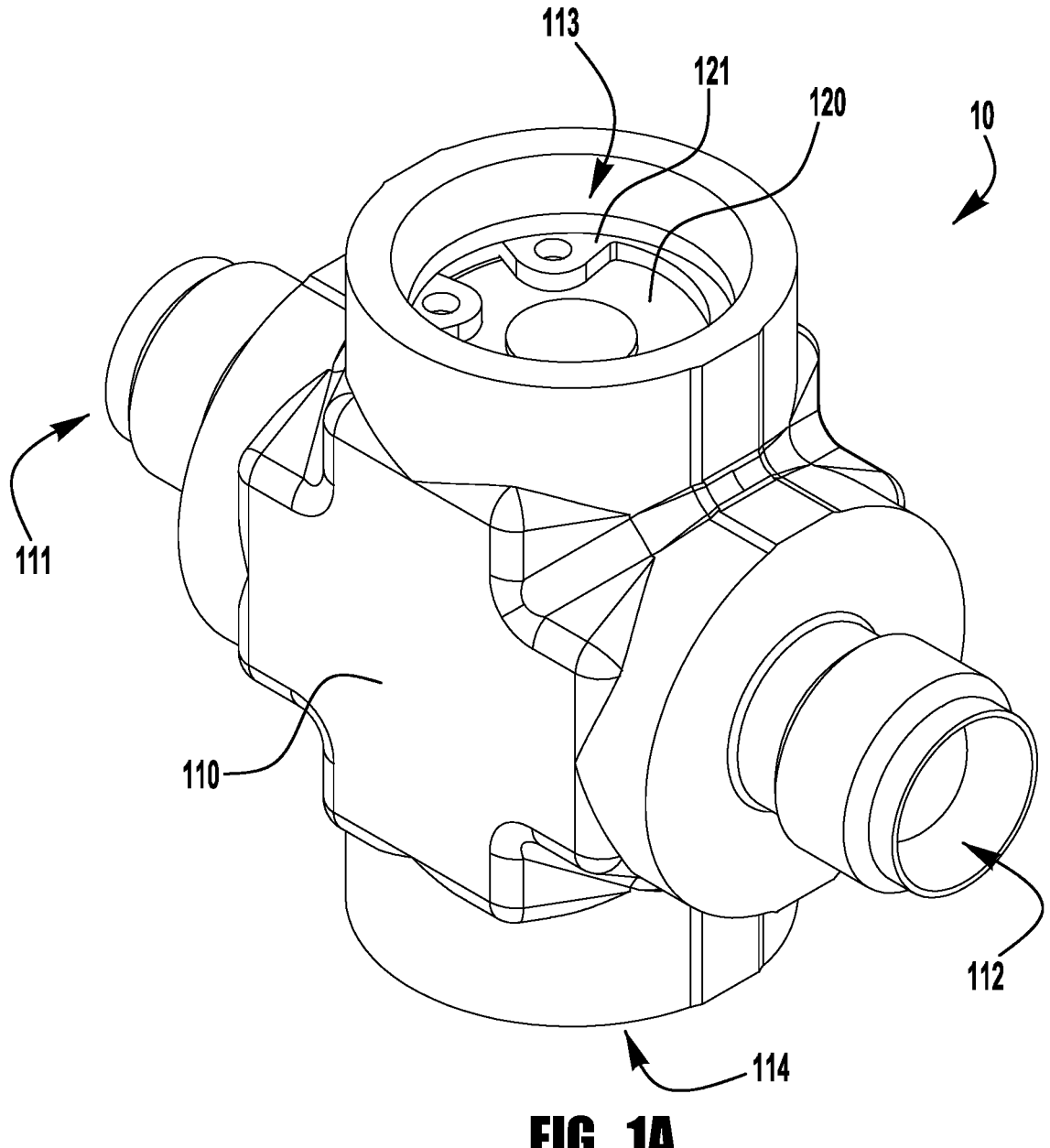
FIG. 1A is a perspective view of the flow sensing device of FIG. 1.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present disclosure describe flow sensing devices with pressure sensors for measuring differential pressure and correlating the differential pressure to flow rate, in other embodiments, one or more of the features described herein may be applied to other fluid system components, including, for example, conduit fittings and valves.

According to an aspect of the present disclosure, as illustrated in the cross-sectional view of FIG. 1, a flow sensing device 100 may be provided with a cross-shaped body 110 including laterally extending inlet and outlet ports 111, 112 and axially extending upstream and downstream sensor ports 113, 114. As shown, the inlet port 111 may, but need not, be substantially coaxial with the outlet port 112 (along axis X, as shown), and the upstream sensor port 113 may, but need not, be substantially coaxial with the downstream sensor port 114 (along axis Y, as shown). The inlet and outlet ports 111, 112 may include any suitable fluid system connectors, including, for example, one or more tube fittings, face seal fittings, threaded pipe ends, or weld ends. The inlet port 111 is connected in fluid communication with the upstream sensor port 113 by an inlet branch port 116, and the outlet port 112 is connected in fluid communication with the downstream sensor port 114 by an outlet branch port 117. The upstream and downstream sensor ports 113, 114 are connected by a flow restricting passage 115 extending generally axially from the upstream sensor port 113 to the downstream sensor port 114. While the flow restricting passage 115 may be specifically configured to maintain laminar flow through the device 100 (e.g., as a laminar flow element, or LFE), in other embodiments, the flow restricting passage may permit turbulent flow, or a combination of laminar flow and turbulent flow, while still providing for a consistent desired flow rate or range of flow rates. As shown, other than the branch ports 116, 117, the body 110 may (but need not) be substantially symmetrical about either or both of the X and Y axes.

An upstream pressure sensor 120 is installed in the upstream sensor port 113 and is configured to generate a signal corresponding to an upstream pressure, and a downstream pressure sensor 130 is installed in the downstream sensor port and is configured to generate a signal corresponding to a downstream pressure. The pressure sensors 120, 130 may transmit signals to an electronic controller, shown schematically at 150, in circuit communication with the pressure sensors, for example, by wired or wireless communication, with the electronic controller being configured to evaluate the upstream and downstream pressures corresponding to the received signals, to determine a pressure differential across the flow restricting passage and a corresponding flow rate through the flow sensing device 100.

The upstream and downstream pressure sensors 120, 130 may include any suitable type of pressure sensor (e.g., a piezoresistive strain gauge, a capacitive pressure sensor, an electromagnetic pressure sensor, a piezoelectric pressure sensor), which may be securely retained within the corresponding sensor port 113, 114, for example, using a retaining ring 121, 131, and may be sealed within the corresponding sensor port 113, 114, for example, using an O-ring or gasket seal 122, 132. In an exemplary embodiment, the sensor may be configured to detect or measure both pressure and temperature, and transmit pressure and temperature indicating signals to the controller. The controller may be configured to process the pressure and temperature indicating signals, for example, to determine pressure, temperature, and/or flow rate, and/or to provide a measured output of any one or more of these parameters. An exemplary sensor configured to measure pressure and temperature is the LD series piezoresistive OEM pressure transmitter, manufactured by Keller.

Figure 1B:
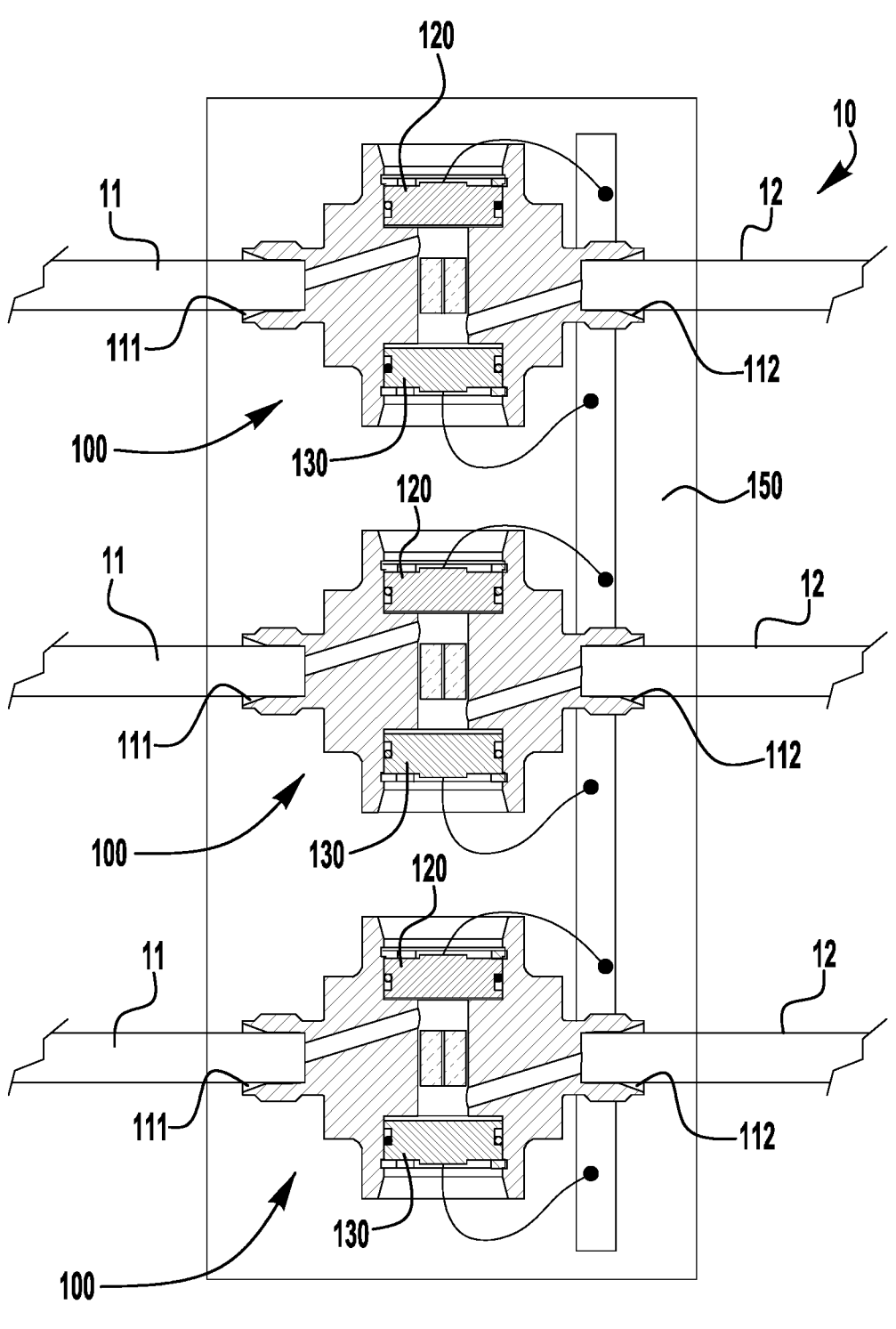
FIG. 1B is a side view of a multiple flow sensing device system, in accordance with another aspect of the present disclosure.

The compact arrangement of the cross-shaped body 110 of the flow sensing device 100 may allow the flow sensing device to be incorporated into smaller enclosures or smaller equipment, or more seamlessly into existing systems. While a system including a plurality of flow sensing devices may include a separate controller connected with each of the flow sensing devices, in another embodiment, the compact flow sensing devices may be arranged and configured for electrical connection with a single controller. FIG. 1B illustrates an exemplary system 10 including a plurality of flow sensing devices 100 arranged end to end, with upstream and downstream pressure sensors 120, 130 electrically connected to the controller 150, and inlet and outlet ports 111, 112 connected to parallel fluid lines 11, 12.

Many different suitable laminar flow restricting passages may be utilized. In some embodiments, one or more flow restricting passages may be integrally formed in the body, for example, by drilling, machining, or additive manufacturing (e.g., 3D printing). In other embodiments, one or more flow restricting passages may be defined by a flow restricting element formed from one or more inserts (e.g. plugs, plates, etc.) installed in a cavity in the body between the upstream and downstream sensor ports. This type of flow passage insert arrangement may facilitate formation of the flow passages, and/or may allow for adaptability of the flow sensing device, for example, by allowing for different ranges of flow rate and pressure differential.

Figures 2, 3:
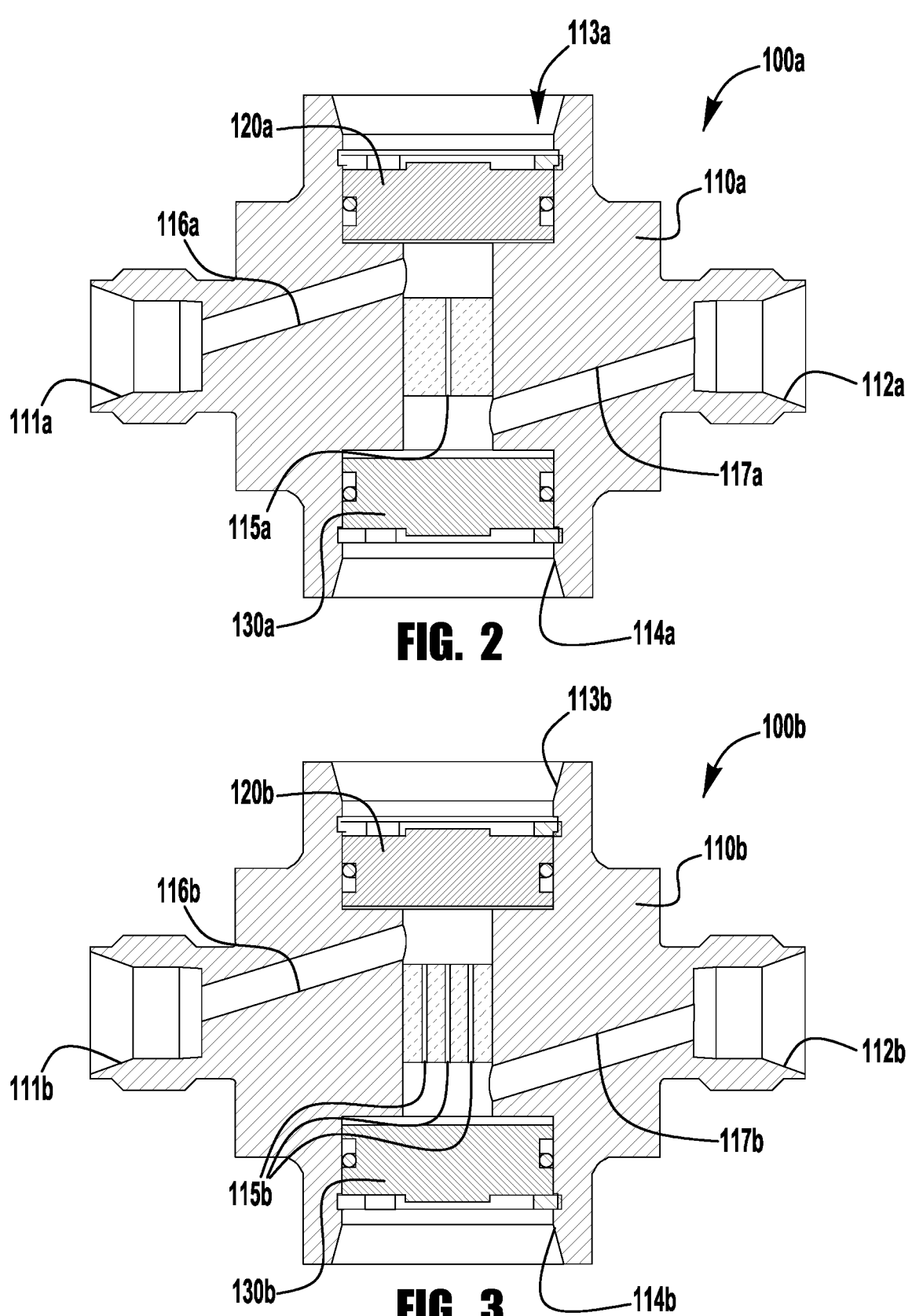
FIG. 2 is a cross-sectional view of an exemplary flow sensing device, in accordance with another aspect of the present disclosure.
FIG. 3 is a cross-sectional view of an exemplary flow sensing device, in accordance with another aspect of the present disclosure.

In one example, as shown in FIG. 2, a body 110a of a flow sensing device 100a includes a narrow axially extending (e.g., capillary) passage 115a extends between the upstream sensor port 113a and the downstream sensor port 114a. In another exemplary embodiment, as shown in FIG. 3, a body 110b of a flow sensing device 100b includes multiple narrow axially extending passages 115b extends between the upstream sensor port 113b and the downstream sensor port 114b, for example, to provide for increased laminar flow while limiting the axial length of the body 110b.

Figures 4, 5:
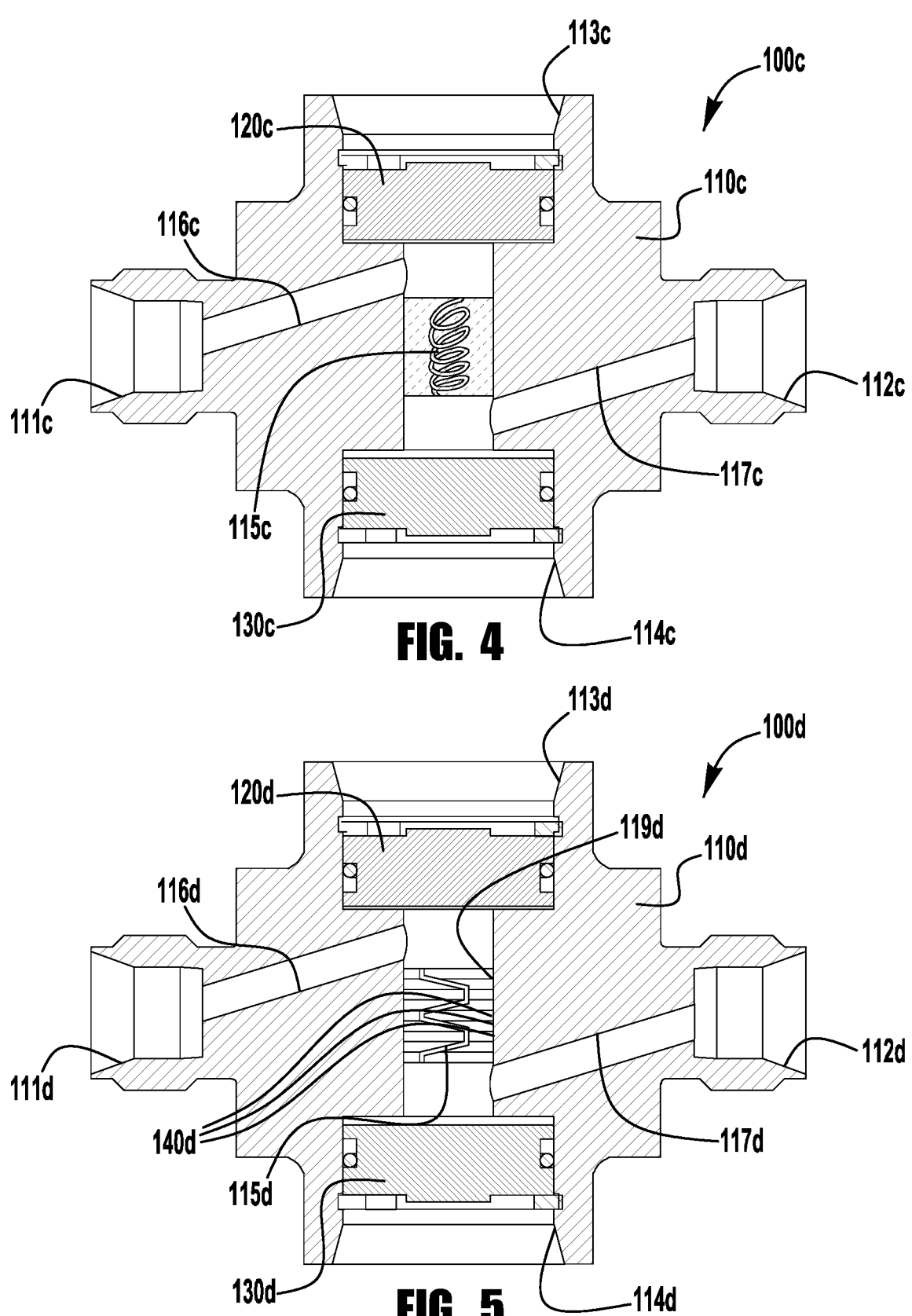
FIG. 4 is a cross-sectional view of an exemplary flow sensing device, in accordance with another aspect of the present disclosure.
FIG. 5 is a cross-sectional view of an exemplary flow sensing device, in accordance with another aspect of the present disclosure.

In another exemplary embodiment, as shown schematically in FIG. 4, the body 110c of a flow sensing device 100c may be provided with one or more narrow, laminar flow restricting passages 115c having a plurality of coils or convolutions arranged to provide an extended passage length over a limited axial dimension of the body, between the upstream and downstream sensor ports 113c, 114c. These convoluted or coiled passages may be formed, for example, by additive manufacturing to facilitate production of one or more convoluted laminar flow restricting passages 115c between the upstream sensor port 113c and the downstream sensor port 114c. In another exemplary embodiment, as shown in FIG. 5, the body 110d of a flow sensing device 100d may include a central cavity 119d retaining a stack of plates 140d having holes and/or slots aligned to define the passage(s) 115d. In other embodiments, convoluted or selectively contoured passages (formed, for example, by additive manufacturing) may be utilized to provide or perform other fluid flow functions such as, for example, mixing, swirling, heat/cold tracing or other such functionality.

Figures 6, 7:
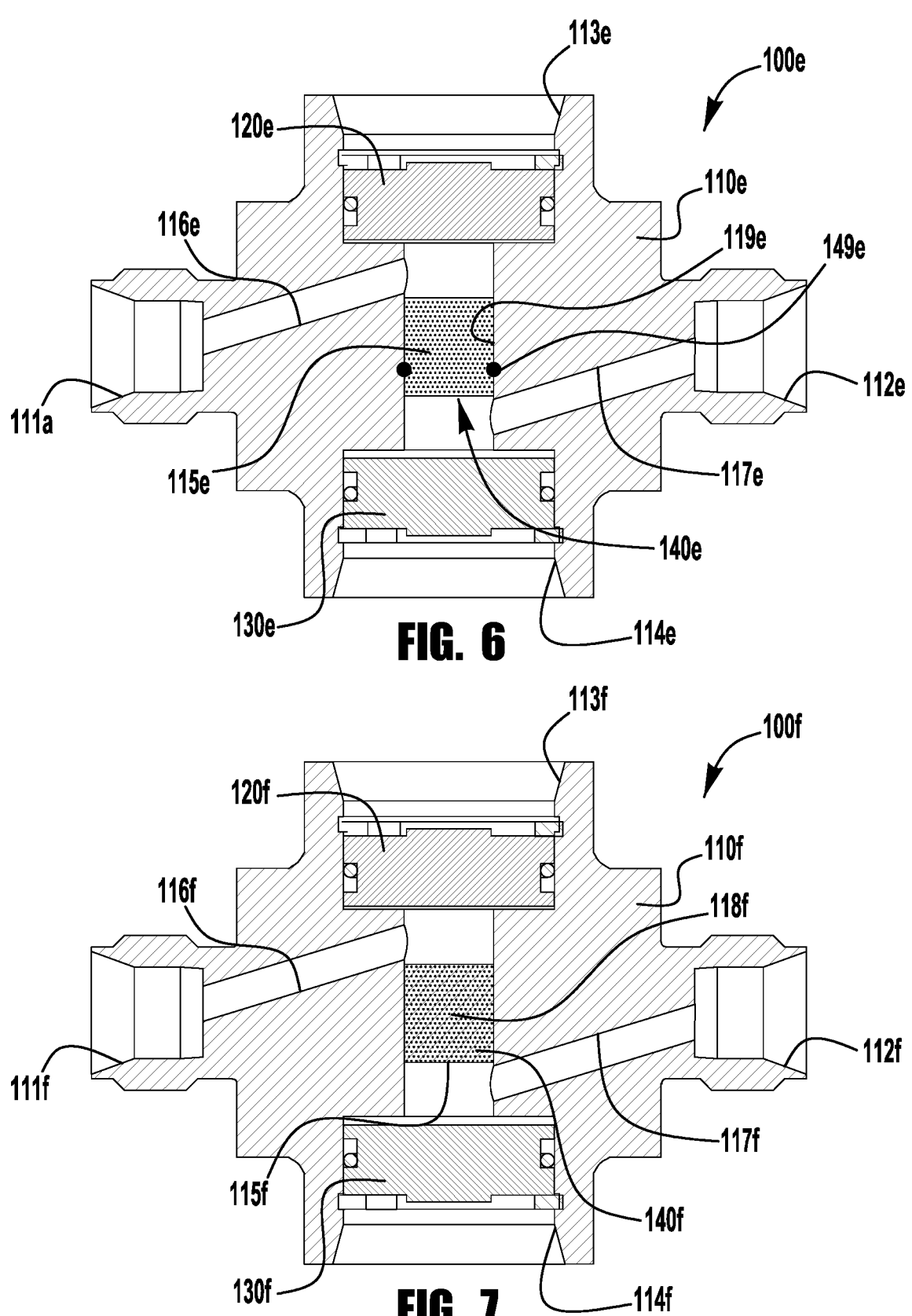
FIG. 6 is a cross-sectional view of an exemplary flow sensing device, in accordance with another aspect of the present disclosure.
FIG. 7 is a cross-sectional view of an exemplary flow sensing device, in accordance with another aspect of the present disclosure.

In other exemplary embodiments, as shown in FIG. 6, a body 110e of a flow sensing device 100e may include a flow restricting element 140e (e.g., a sintered element) installed in a cavity 119e of the body 110e to define a flow passage 115e that restricts flow to a desired flow condition (e.g., laminar flow and/or a desired flow range). An O-ring or other such gasket seal 149e may be provided around the flow restricting element 140e (e.g., in an inner peripheral groove in the body cavity 119e, and/or in an outer peripheral groove in the flow restricting element 140e) may be provided around the flow restricting element to seal against leakage/flow past the periphery of the flow restricting element. In another exemplary embodiment, as shown in FIG. 7, the body 110f of a flow sensing device 100f may be formed by additive manufacturing to facilitate production of a porous, axially extending portion 140f of the body between the upstream and downstream sensor ports 113f, 114f, with a pore size and density selected to provide a desired flow condition.

Flow restricting sintered elements or other such porous or narrow passage restricting portions may tend to get blocked or clogged by contaminants in the system fluid, which may affect system flow rates and the flow readings provided by the device. According to another aspect of the present disclosure, a flow sensing device body may be provided with a flow restricting element shaped or otherwise configured to divert or collect contaminants into a recessed portion of the body cavity, thereby minimizing the clogging or blocking of the porous flow restricting element.

Figure 8:
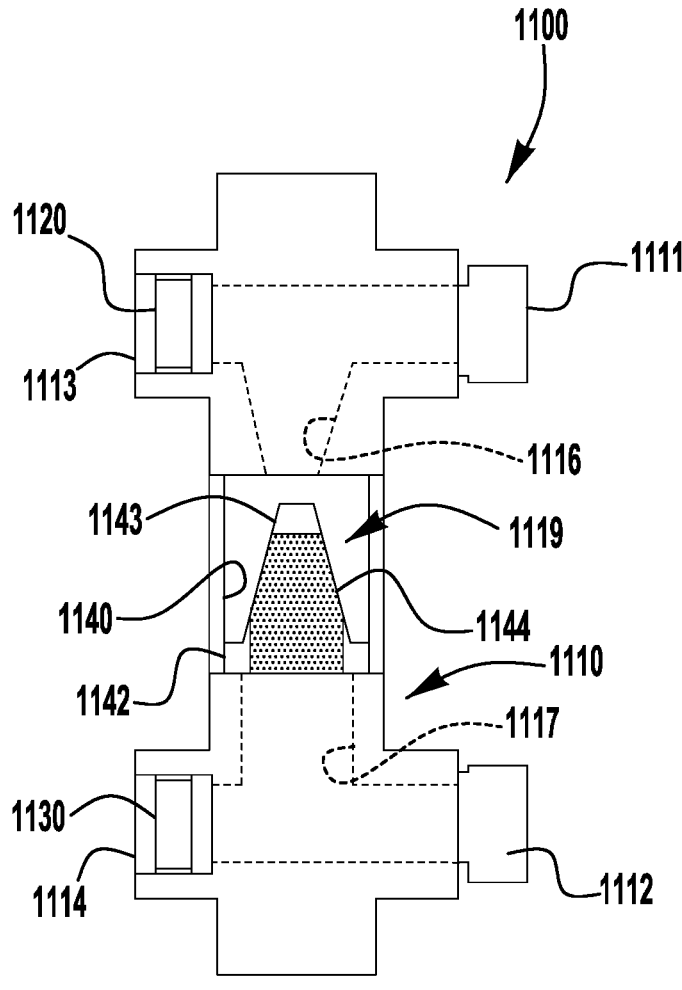
FIG. 8 is a schematic view of a flow sensing device, in accordance with another aspect of the present disclosure.

FIG. 8 schematically illustrates an exemplary flow sensing device 1100 including a body member 1110 having inlet and outlet ports 1111, 1112 and upstream and downstream sensor ports 1113, 1114. The inlet and outlet ports 1111, 1112 may include any suitable fluid system connectors, including, for example, one or more tube fittings, face seal fittings, threaded pipe ends, or weld ends. The inlet port 1111 is connected in fluid communication with the upstream sensor port 1113 by an internal upstream passage 1116, and the outlet port 1112 is connected in fluid communication with the downstream sensor port 1114 by an internal downstream passage 1117. The upstream and downstream sensor ports 1113, 1114 sealingly retain sensors 1120, 1130 and are connected by a porous flow restricting element 1140 disposed in a cavity 1119 of the body 1110 to define a flow restricting passage 1115. While the flow restricting passage 1115 may be specifically configured to maintain laminar flow through the device 1100, in other embodiments, the flow restricting passage may permit turbulent flow, or a combination of laminar flow and turbulent flow, while still providing for a consistent desired flow rate or range of flow rates.

As shown, the exemplary flow restricting element 1140 includes a conical central porous portion 1141 and an outer peripheral solid or non-porous portion 1142 that forms an annular recess into which fluid contaminants may collect without blocking or further restricting the flow path. The internal upstream passage 1116 may be shaped to direct fluid flow toward the surfaces of the body cavity 1119 and the annular recess 1142. Alternatively, as shown, an upstream end or tip 1143 of the flow restricting element may also be solid or non-porous, and the internal upstream passage 1116 in the body 1110 may be shaped to direct fluid flow toward the solid restricting element tip, such that the contoured tip directs contaminants radially outward while minimizing any tendency for the contaminants to become embedded in the porous portions of the flow restricting element. Other porous element shapes may be utilized including, for example, hemispherical or pyramid shaped elements. The flow restricting element 1140 may be provided as an insert for installation in the body cavity 1119, similar to the embodiment of FIG. 6. Alternatively, the flow restricting element 1140 may be integrally formed with the body 1110, similar to the embodiment of FIG. 7. In either case the flow restricting element may be formed using additive manufacturing (e.g., 3D printing) which may be well suited to selectively form portions of the element in porous and non-porous materials.

Porous restricting portions or narrow restricting passages may become partially blocked or clogged by condensation in a gaseous fluid system, for example, where the fluid system is subjected to lower temperatures or sudden changes in temperature. According to another aspect of the present disclosure, a flow sensing device body may be provided with a flow restriction heating arrangement, for example, to selectively evaporate or boil off condensation, or to maintain the flow restricting element at temperatures that will prevent condensation, thereby preventing this type of restricting element blockage.

Figure 9:
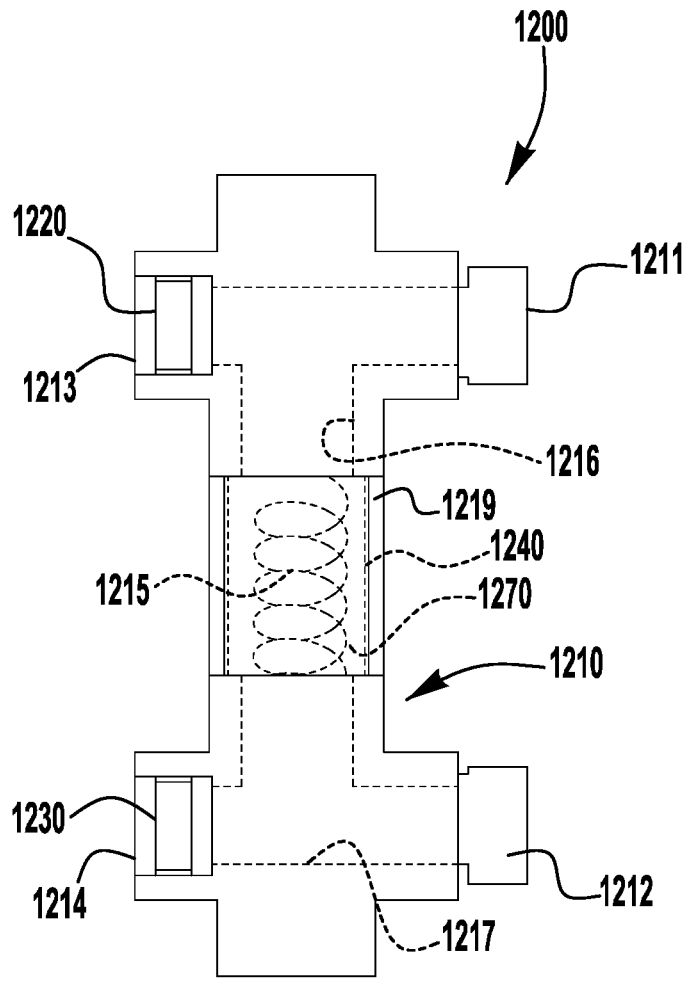
FIG. 9 is a schematic view of another flow sensing device, in accordance with another aspect of the present disclosure.

FIG. 9 schematically illustrates an exemplary flow sensing device 1200 including a body member 1210 having inlet and outlet ports 1211, 1212 and upstream and downstream sensor ports 1213, 1214. The inlet and outlet ports 1211, 1212 may include any suitable fluid system connectors, including, for example, one or more tube fittings, face seal fittings, threaded pipe ends, or weld ends. The inlet port 1211 is connected in fluid communication with the upstream sensor port 1213 by an internal upstream passage 1216, and the outlet port 1212 is connected in fluid communication with the downstream sensor port 1214 by an internal downstream passage 1217. The upstream and downstream sensor ports 1213, 1214 sealingly retain sensors 1220, 1230 and are connected by a flow restricting element 1240 disposed in a cavity 1219 of the body 1210 and defining a flow restricting passage 1215 (e.g., one or more formed passages or a porous flow restricting material). While the flow restricting passage 1215 may be specifically configured to maintain laminar flow through the device 1200, in other embodiments, the flow restricting passage may permit turbulent flow, or a combination of laminar flow and turbulent flow, while still providing for a consistent desired flow rate or range of flow rates.

As shown, the flow restricting device 1200 includes a flow restriction heating arrangement surrounding the flow passage 1215 in the flow restricting element 1240. The heating arrangement 1270, which may be formed in the flow restricting element 1240, around the flow restricting element (e.g., between an outer surface of the flow restricting element and an inner surface of the body cavity 1219), or around the body member 1210 in alignment with the flow passage. A wide variety of flow restricting heating arrangements may be utilized, including, for example: one or more heating circuits configured to receive a current for heating the flow restricting element, or one or more heat trace passages for passing heated fluid (e.g., steam) through or around the flow restricting element. The flow restricting element 1240 may be provided as an insert for installation in the body cavity 1219, similar to the embodiment of FIG. 6. Alternatively, the flow restricting element 1240 may be integrally formed with the body 1210, similar to the embodiment of FIG. 7. In either case the flow restricting element may be formed using additive manufacturing (e.g., 3D printing) which may be well suited to form heat trace or circuit receiving passages in or around the flow restricting element.

While the controller(s) may be separate from, and physically and electrically tethered to, the flow sensing element(s), in other embodiments, a flow sensing element may be provided in a self-contained module, for example, for ease of installation in a fluid system, with an enclosure containing the flow sensing device (with external connectors for connecting the flow sensing device with the fluid system) and the controller. The controller may be configured to communicate (e.g., by wired or wireless communication) with an external device (e.g., server, router, computer, tablet, smartphone) to deliver information about the fluid flow conditions (e.g., pressure, temperature, flow rate). Additionally or alternatively, the module may be provided with a user interface for providing information about the fluid flow conditions at the module (e.g., using an LED array or LCD display screen).

FIGS. 10A-11B illustrate various views of an exemplary fluid monitoring module 500, including an enclosure 501 formed from a housing 502 and a cover 503 (secured together, for example, using bolts or other fasteners) enclosing a flow sensing device 505 and controller 550. The flow sensing device 505 may, for example, be similar to any of the flow sensing devices 100a-f described herein, and may be provided with end connectors 506 extending through openings in the enclosure 501. Gaskets or other such seals 504 (FIG. 11A) may surround the end connectors 506 in the openings, for example, to prevent moisture or other contaminants from entering the enclosure. While the end connectors may be provided in a variety of locations and orientations, in the illustrated embodiment, the end connectors 506 extend from a common wall of the enclosure, for example, to facilitate installation into an existing fluid system. As shown in FIGS. 10C and 11A, the flow sensing device 505 may be provided with elbow fittings or other such connectors and adapters to position the end connectors 506 at the desired location and orientation. In one such example, the end connectors 506 of the module 500 may be spaced and oriented to corresponding with a conventional flow rate measuring device (e.g., a rotameter-style flow rate measuring device), such that the conventional flow rate measuring device of an existing system may be easily replaced with the module 500. In another embodiment (not shown), the end connectors may extend axially from the fluid monitoring module, for example, to facilitate inline installation of the flow sensing device, or of multiple flow sensing devices with multiple parallel, closely spaced fluid lines. In still other embodiments, the end connectors may be offset from each other and may extend in opposite directions from opposite sides of the housing, or perpendicularly from adjacent sides of the housing.

Figure 10A:
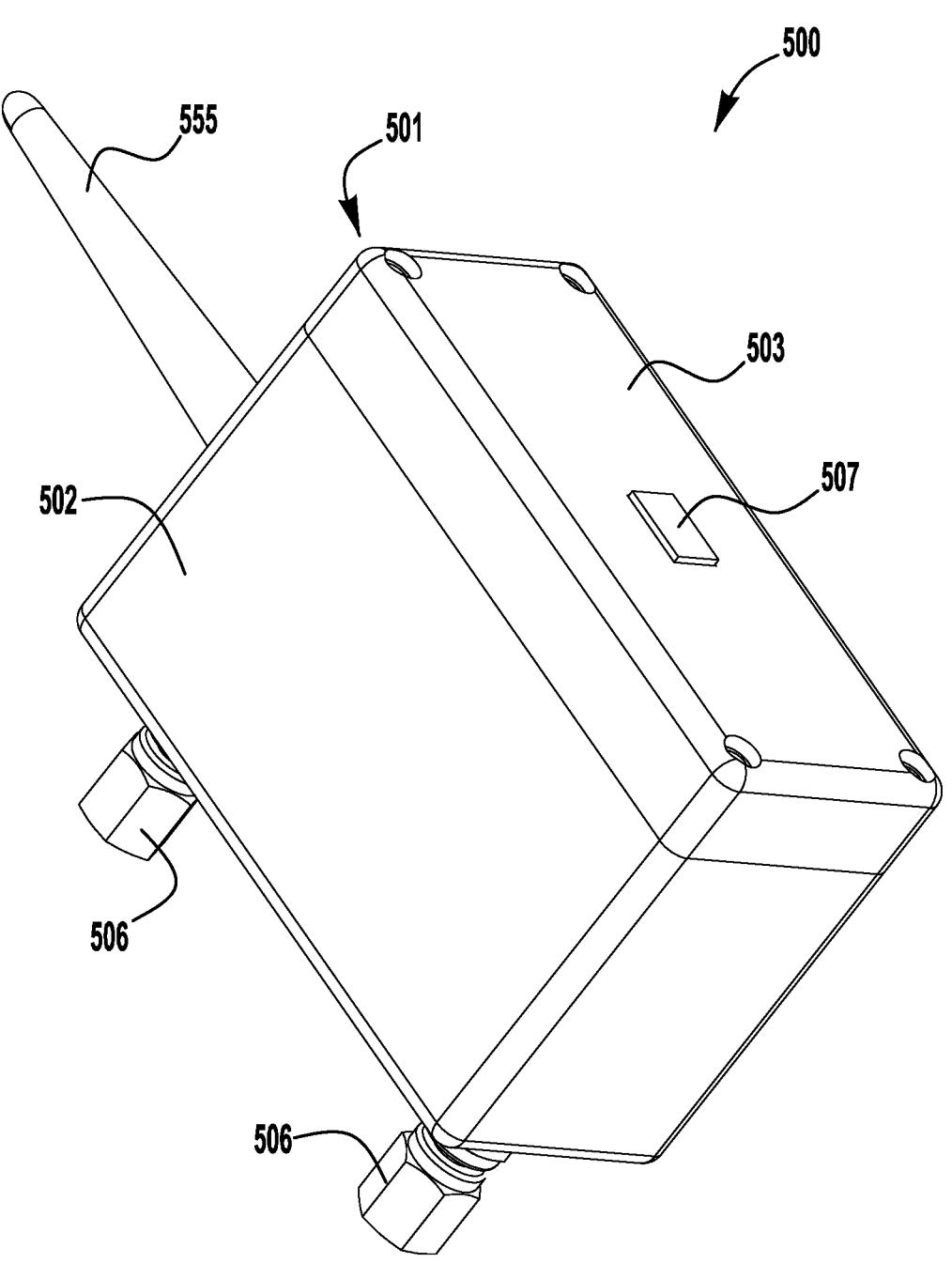
FIG. 10A is a front perspective view of an exemplary wireless fluid monitoring module, in accordance with another aspect of the present disclosure.
Figure 10B:
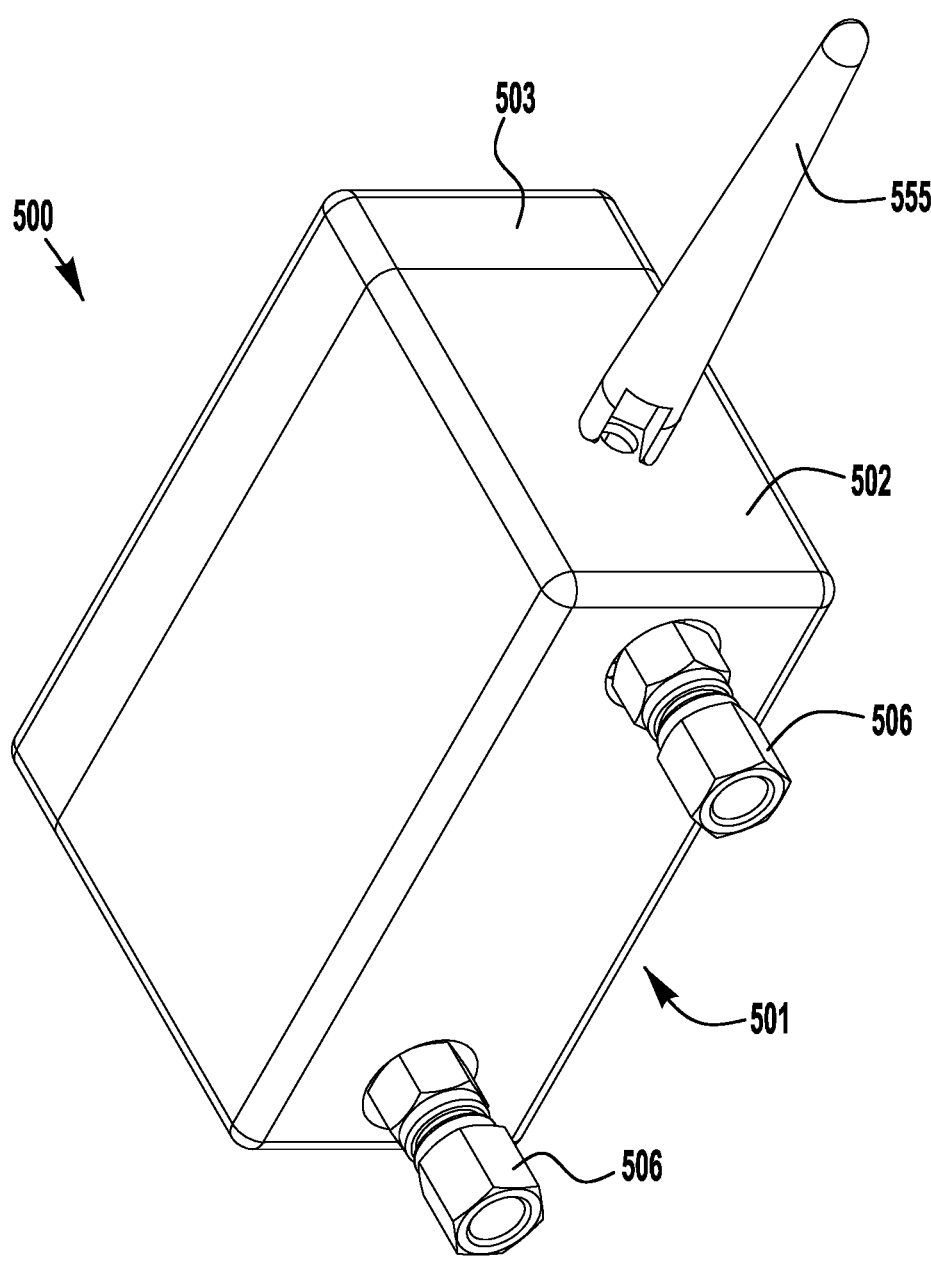
FIG. 10B is a rear perspective view of the wireless fluid monitoring module of FIG. 10A.
Figure 10C:
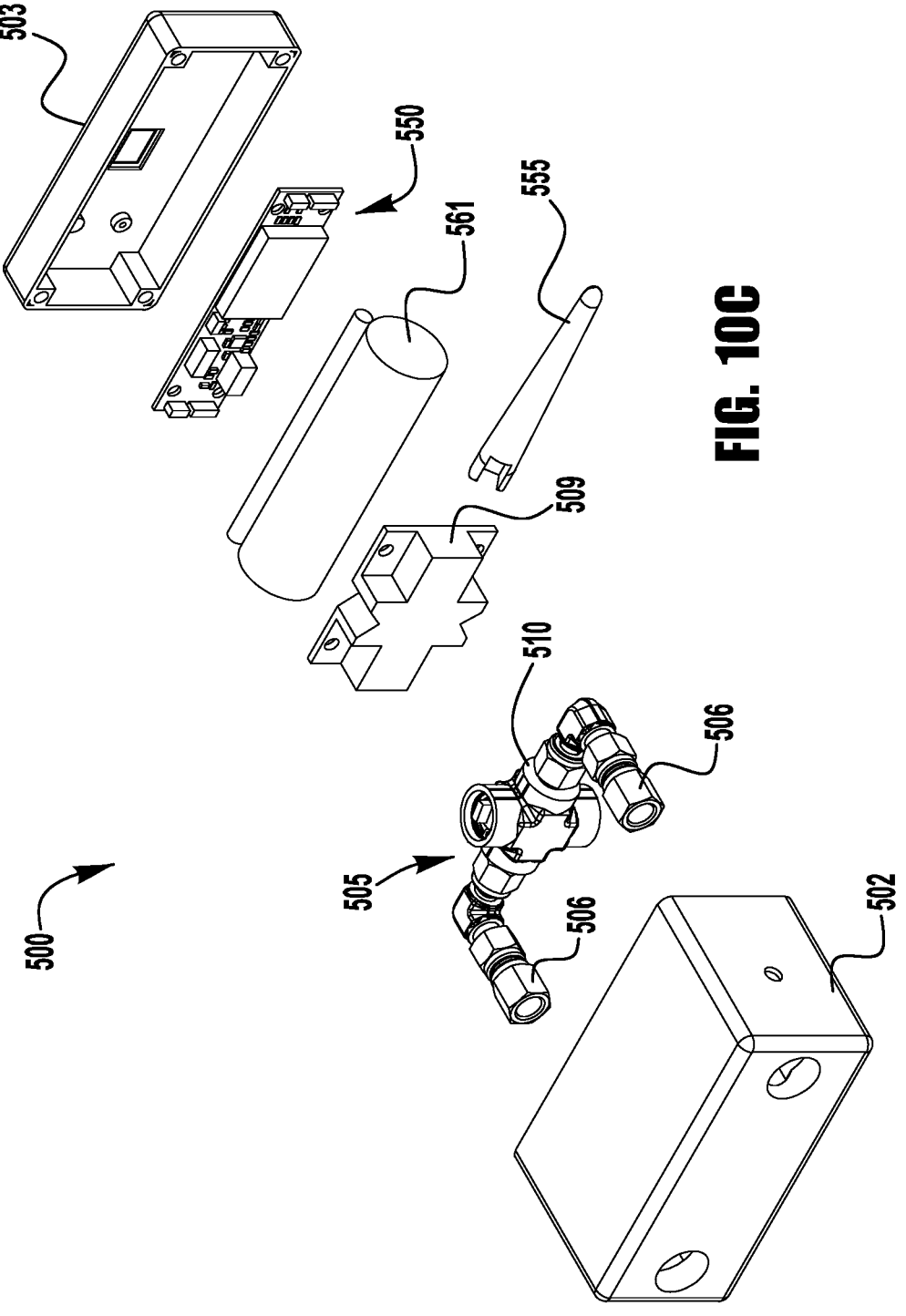
FIG. 10C is an exploded perspective view of the wireless fluid monitoring module of FIG.
Figure 11A:
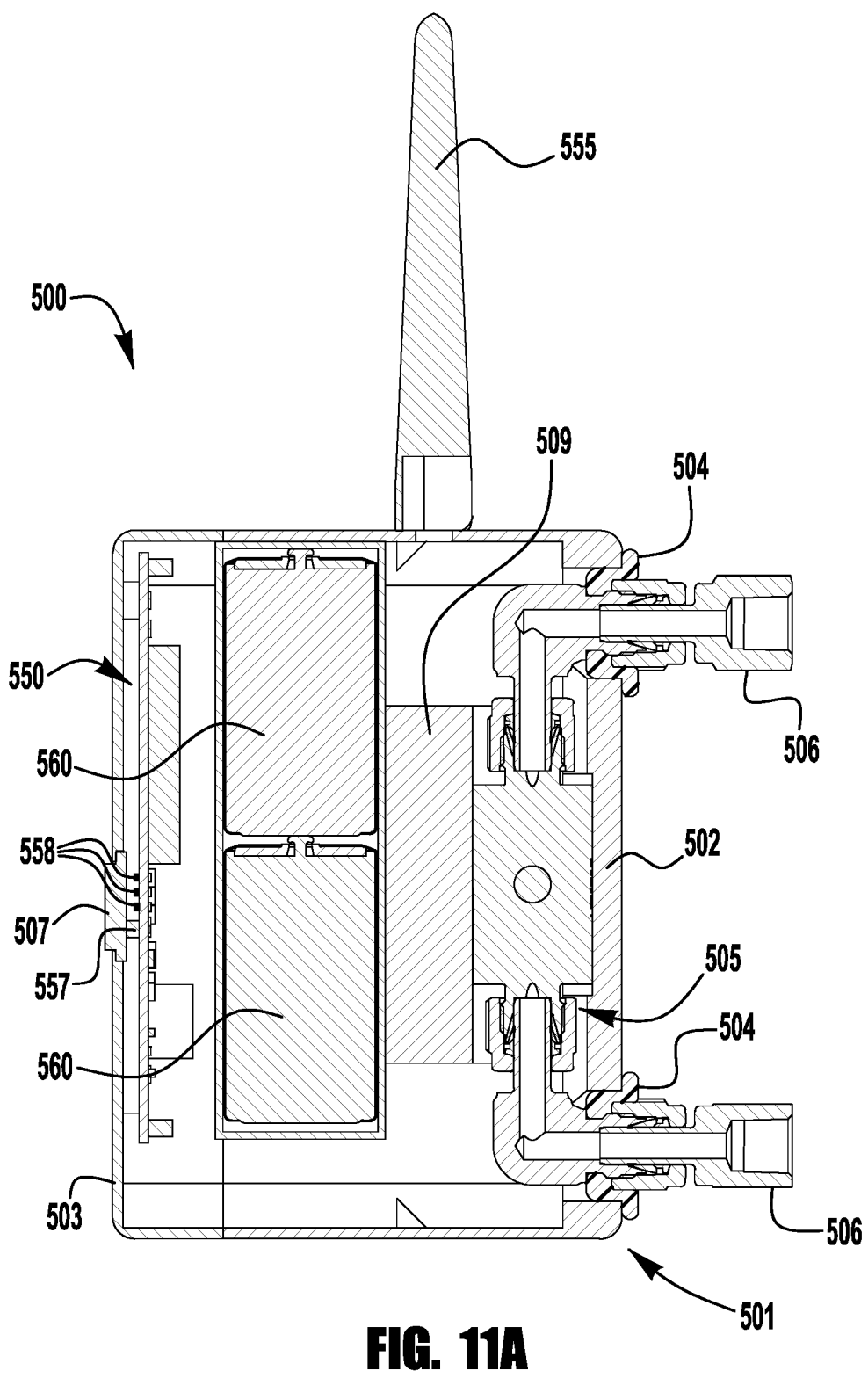
FIG. 11A is a side cross-sectional view of the wireless fluid monitoring module of FIG. 10A.
Figure 11B:
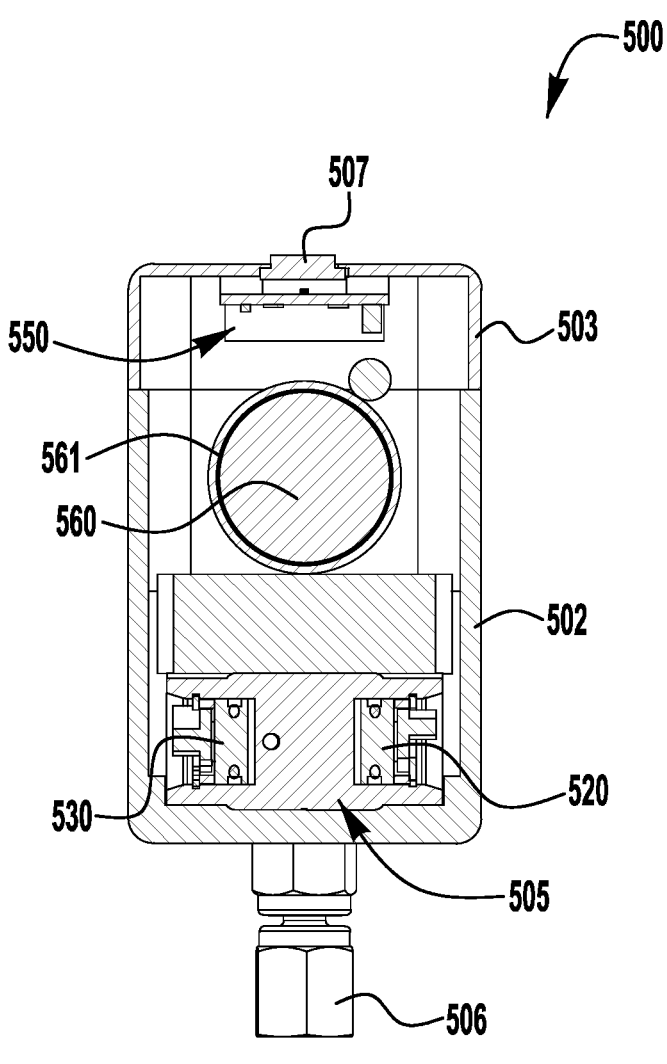
FIG. 11B is a top cross-sectional view of the wireless fluid monitoring module of FIG. 10A.

While the module may be provided with external wiring for connection with an external power source (e.g., wall outlet), the module 500 may additionally or alternatively include one or more batteries 560, as shown in FIG. 11A, electrically connected with the controller 550 to power the controller hardware (e.g., processor, transmitter, LEDs) and sensors 520, 530 of the flow sensing device 505. As shown, the batteries 560 may be disposed in a sleeve 561, for example, to protect and securely position the batteries. In some embodiments, the module may be provided with rechargeable batteries that may be recharged, for example, by electrically connecting external wiring of the module to an external power source. Additionally or alternatively, the enclosed batteries may serve as a back-up power source (e.g., in the event of a building power failure), with the module primarily operating off of an external power source. As shown in FIG. 10C, a spacer bracket 509 may be provided within the enclosure 501, for example, to secure the internal components of the module in a desired position.

The exemplary flow sensing device assembly 505 includes upstream and downstream sensors 520, 530 installed in upstream and downstream sensor ports 513, 514 of a body member 510. The sensors 520, 530 are connected (e.g., by wiring within the module enclosure) to the controller 550 to transmit pressure and temperature indicating signals to the controller. The controller 550 is configured to process the pressure and temperature indicating signals, for example, to determine pressure, temperature, and/or flow rate of fluid passing through the flow sensing device, and/or to provide a measured output of any one or more of these parameters.

Figure 12:
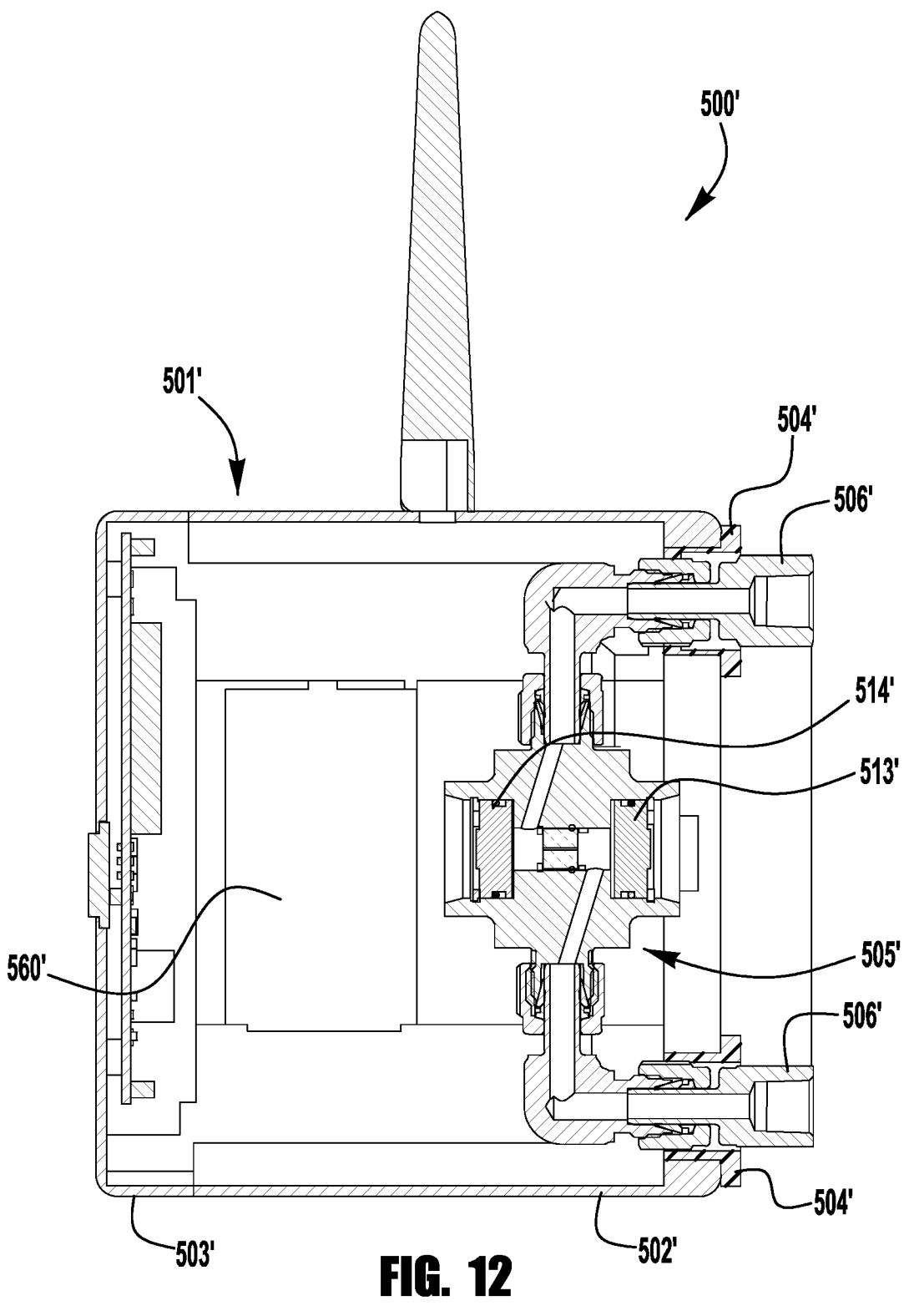
FIG. 12 is a side cross-sectional view of another exemplary wireless fluid monitoring module, in accordance with another aspect of the present application.

In the embodiment of FIGS. 10A-11B, the sensor ports 513, 514 of the body 510 are oriented to face the sides of the housing 502. Alternatively, as shown in FIG. 12, the sensor ports 513', 514' of the body 510' may be oriented to face the housing rear wall and the cover 503', allowing the width of the enclosure to be reduced. Additionally or alternatively, the battery size may be reduced (e.g., replacing two C cell batteries 560 with one D cell battery 560', as shown in FIG. 12) to allow the height of the enclosure to be reduced.

The module may be provided with external wiring for a wired connection with an external device (e.g., computer). Additionally or alternatively, as shown, the module 500 may be provided with a wireless transmitter (e.g., provided on a circuit board of the controller 550) for wirelessly transmitting fluid data to a remote device (e.g., server, router, computer, tablet, smartphone), for example, using direct or indirect wireless communication with the remote device. The transmitter may be configured to communicate using any number of suitable wireless communication protocols and capabilities, such as, for example, WiFi, Bluetooth, ZigBee, RFID, NFC, and wireless USB communication. As shown, the module 500 may include an external antenna 555, electrically connected with the controller transmitter, for enhanced wireless communication with a remote device. In an exemplary system, a WiFi gateway router may be provided for wireless communication with one or more modules, for example, to establish a browser interface (which may eliminate the need for desktop software), facilitate commissioning of field devices, establish data system/cloud interfaces, and provide for simplified troubleshooting and diagnostics.

To facilitate commissioning and control (e.g., power on/off, synchronization) of the module, the module may be provided with a user interface, such as, for example, one or more knobs, switches or buttons. In the illustrated embodiment, the module 500 includes an external, user depressible button 507 disposed in an opening in the cover 503 and positioned for actuation of a button switch 557 on the controller 550, which may be actuated, for example, to turn on the controller, to turn off the controller, or to commission/ synchronize the controller. The button 507 may be provided in a transparent or translucent material, to provide illumination from one or more LEDs 558 on the controller 550, which may be illuminated, for example, to provide user indication of a controller status (e.g., power on/off, connectivity, recognized user actuation). The LEDs 558 may provide multi-color illumination (either by providing multiple LEDs each having different color illumination, or one or more multi-color LEDs) and/or pulsed illumination, for example, to identify multiple distinguishable status conditions.

Figures 13A, 13B, 13C:
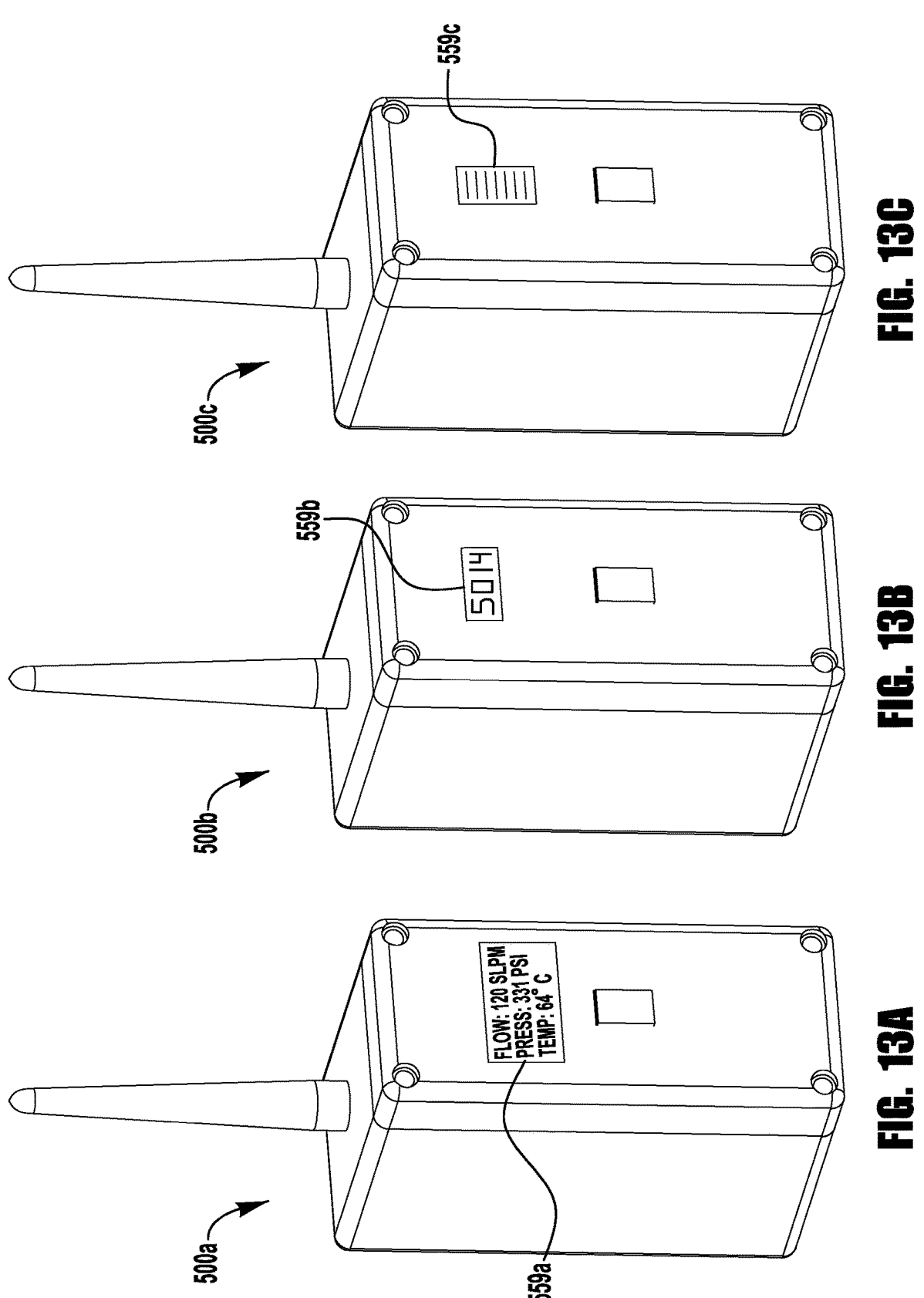
FIG. 13A is a perspective view of another exemplary wireless fluid monitoring module, in accordance with another aspect of the present disclosure.
FIG. 13B is a perspective view of another exemplary wireless fluid monitoring module, in accordance with another aspect of the present disclosure.
FIG. 13C is a perspective view of another exemplary wireless fluid monitoring module, in accordance with another aspect of the present disclosure.

In addition to, or instead of, wired or wireless communication with an external device, the module may be provided with a user interface configured to display fluid flow data on the module. FIG. 13A illustrates an exemplary module 500a including a user interface display screen 559a (e.g., LCD, OLED) disposed on an outer surface of the enclosure (e.g., on the cover 503a) and connected in circuit communication with the module controller, for display of one or more fluid conditions (e.g., flow rate, temperature, pressure). Alternatively, to provide a simpler output display, an LED array 559b, 559c may be used to provide a digital display (e.g., one or more numerical digits), as shown in FIG. 13B, or a multi-bar proportional readout display (e.g., three or more LEDs showing proportional levels of flow rate, pressure, and/or temperature), as shown in FIG. 13C. In an exemplary embodiment of the present disclosure, digital or multi-bar LED displays may utilize multi-color LEDs to display multiple types of fluid data using the same set of LEDs. For example, the digital LED display 559b of FIG. 13B may provide for illumination of the corresponding LEDs in a first color (e.g., white) to identify a measured flow rate, a second color (e.g., red) to identify a measured pressure, and a third color (e.g., green) to identify a measured temperature. Similarly, the digital LED display 559c of FIG. 13C may provide for illumination of the corresponding LEDs in a first color (e.g., white) to identify a proportional flow rate level, a second color (e.g., red) to identify a proportional pressure level, and a third color (e.g., green) to identify a proportional temperature level. A user may selectively toggle between fluid data by actuating a user interface (e.g., button or knob), or the display may be configured to automatically periodically switch (e.g., every 3-10 seconds) between the different fluid flow data.

In one or more exemplary embodiments, a fluid monitoring module, such as, for example, any of the modules described herein, may be configured to provide a number of desired properties and conditions, including. For example, a fluid monitoring module may be configured to provide typical desired sample stream and bypass flow ranges, including, for example, gas flow rates of about 0.05 to 20 SLPM (analyzer) or liquid flow rates of about 0.05-20 LPM (bypass). An exemplary fluid monitoring module may be configured to provide flow measurement accuracy of less than about 10% of full scale (e.g., about +/−5% accuracy), and may be configured to provide excellent repeatability and stability. An exemplary fluid monitoring module may, for example, be rated for use from about −20 C to 80 C, or at a maximum ambient temperature of about 85 C. An exemplary fluid monitoring module may, for example, be rated for operating pressures between about 50 psig and 150 psig, and may be rated for 1900 psig proof or 3500 psig burst. Exemplary materials of construction may include, for example, 316 stainless steel, Hastelloy, FKM, and FFKM. An exemplary fluid monitoring module may include appropriate safety ratings, including, for example, class 1 division 1 for the transmitter, class 1 division 2 for the gateway, ATEX Zone 1, and/or IECEx Zone 1. An exemplary fluid monitoring module may be configured for 2.4 GHz mesh wireless communication. An exemplary fluid monitoring module may include a disposable lithium battery with at least a five year life. An exemplary fluid monitoring module may be rated for a lag time of T90=5 seconds maximum for 0.2 SLPM gas flow.

In one or more exemplary embodiments, a fluid monitoring module, such as, for example, any of the modules described herein, may be used in a variety of applications, including, for example, any one or more locations in a process analytical system. Examples include field stations, fast loop systems, grab sampling locations, calibration and switching locations, sample conditioning locations, gas and/ or utilities analyzers, and sample disposal locations.

According to another aspect of the present disclosure, a flow sensing device may be configured to facilitate removal of a flow restricting element without removing the flow sensing device from the system, for example, to replace a damaged or contaminated flow restricting element, to facilitate inspection of the flow restricting element, or to replace the flow restricting element with a second flow restricting element providing a different flow condition (e.g., different flow rate). In one such embodiment, the flow sensing element may be provided with first and second end connections facilitating disconnection and removal of the flow sensing element from the inlet/outlet ports and the upstream/ downstream sensor ports. As one example, first and second end connections of a flow sensing element may include zero clearance fittings (e.g., gasketed VCO fittings manufactured by Swagelok Co.) facilitating removal and reinstallation/ replacement of the flow sensing element without repositioning the ported ends of the flow sensing device.

Figure 14:
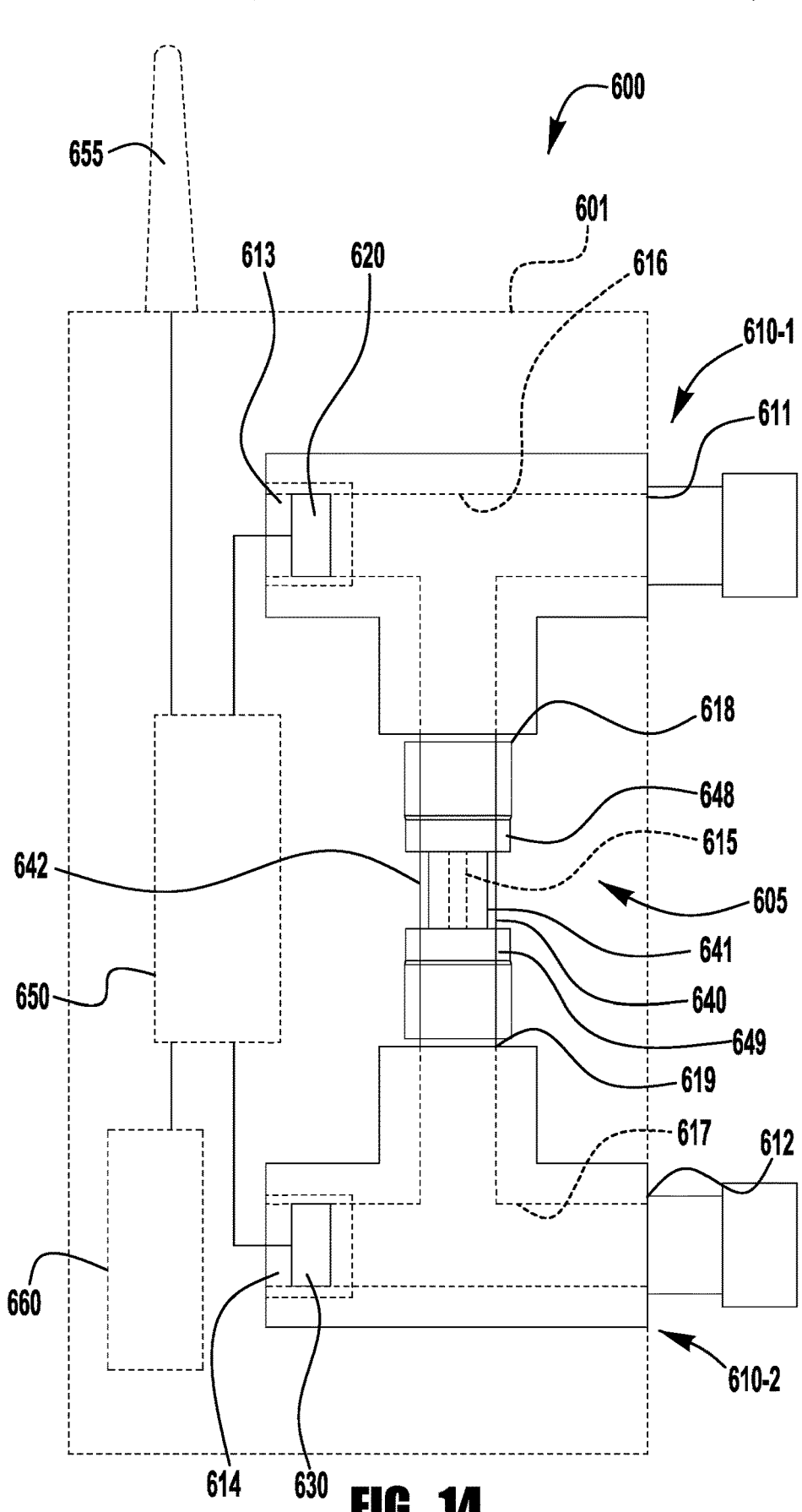
FIG. 14 is a schematic view of a fluid monitoring module, in accordance with another aspect of the present disclosure.

FIG. 14 illustrates an exemplary fluid monitoring module 600 including a flow sensing device 605 configured to facilitate removal of a flow restricting element 640. The exemplary flow sensing device 605 includes first and second T-shaped body members 610-1, 610-2 including first run ports defining laterally outward extending inlet and outlet ports 611, 612, second run ports defining laterally inward extending upstream and downstream sensor ports 613, 614, and branch or connecting ports defining axially extending first and second restrictor connections 618, 619 for connecting with first and second end connectors 648, 649 of the flow restricting element 640. Upstream and downstream sensors 620, 630 (which may be similar to the sensors 120, 130, 520, 530 of the embodiments of FIGS. 1-13) are sealingly installed in the upstream and downstream sensor ports 613, 614.

The inlet port 611, upstream sensor port 613 and first restrictor connection 618 of the first body member 610-1 are connected in fluid communication by an internal T-shaped upstream passage 616 of the first body member 610-1, and the outlet port 612, downstream sensor port 614, and second end connection 619 are connected in fluid communication by an internal T-shaped downstream passage 617 of the second body member 610-2. The ports may include any suitable fluid system connectors, including, for example, one or more tube fittings, face seal fittings, threaded pipe ends, or weld ends.

The upstream and downstream passages 616, 617 are connected by a flow restricting passage 615 in the flow restricting element 640. As described above, the flow restricting passage 615 may take one or more of a variety of forms including, for example, one or more straight or convoluted passages or one or more sintered or other such flow restricting materials. The passage(s) may be formed using one or more of a variety of processes, including machining or additive manufacturing. The flow restricting passages may be formed in one or more inserts 641 (e.g., plugs, plates, etc.) retained in a coupling body 642 to which the first and second end connections 648, 649 are attached (e.g., by welding or integrally forming). In one embodiment, the flow restricting insert(s) may be removable from the coupling body for replacement with alternative flow restricting inserts providing different flow rates, flow paths, materials, or other such properties. In other embodiments, the flow restricting component may be integrally or monolithically formed with the coupling body, such that the entire flow restricting element is replaced. In other embodiments, the flow restricting element 640 may be replaced with a flow restricting element having a different axial length, for example, to adjust the offset of the inlet and outlet ports 611, 612. In still other embodiments, variations in the offset of the inlet and outlet ports may be accommodated by providing the inlet and outlet ports with flexible end connections, such as, for example, hose connections.

The first and second end connections 648, 649 of the exemplary flow restricting element 640 include zero clearance connectors for connection with mating zero clearance connectors of the first and second connections 618, 619 of the first and second body members 610-1, 610-2. An exemplary zero clearance fitting is a VCO fitting, manufactured by Swagelok Co. In one embodiment, the coupling body 642 is provided with male threaded body connectors, and the body members 610-1, 610-2 are provided with welded glands and captured female threaded nuts for coupling with the male threaded body connectors. In another embodiment, the body members 610-1, 610-2 are provided with male threaded body connectors, and the coupling body 642 is provided with welded glands and captured female threaded nuts for coupling with the captured nuts. In still another embodiment, the coupling body 642 is provided with a male threaded body connector for connecting with a captured female nut on one of the first and second body members, and a captured female threaded nut for connecting with a male threaded body connector on the other of the first and second body members. This arrangement may provide an assurance that the flow restricting element is installed in the correct directional orientation.

Figure 14A:
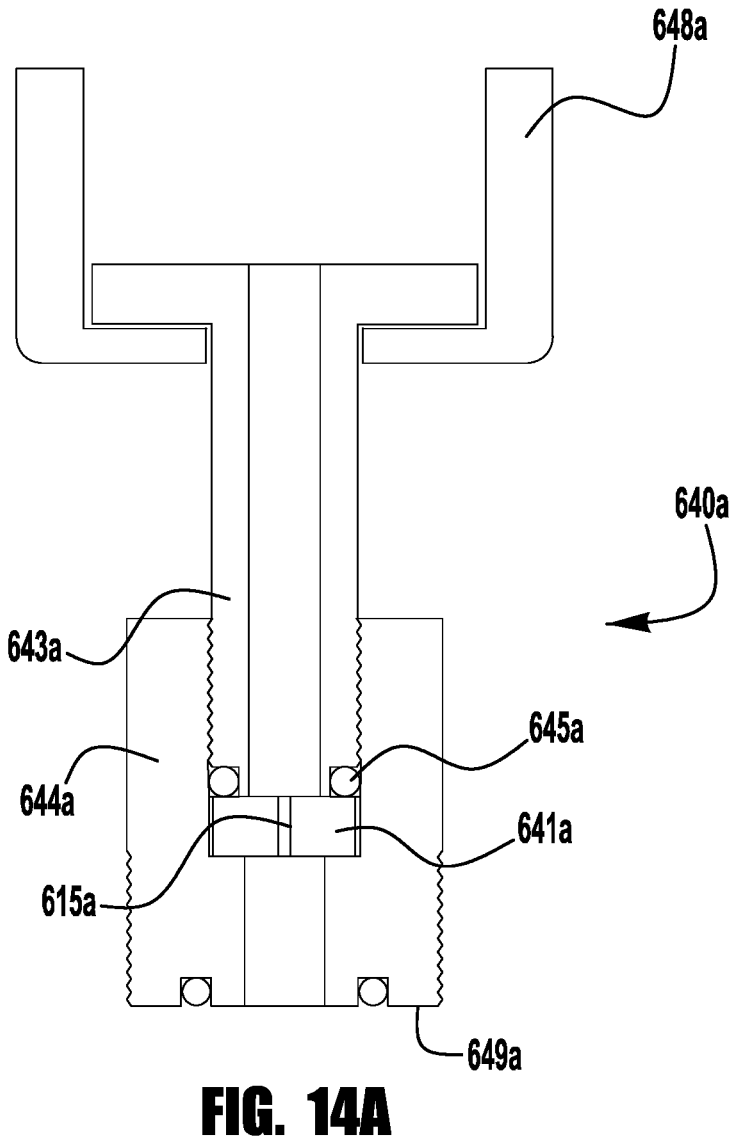
FIGS. 14A-14I are cross-sectional views of exemplary flow restricting elements for a fluid monitoring module, in accordance with another aspect of the present disclosure.

The flow restricting element may be provided as a multiple piece subassembly including one or more connectors detachable to facilitate removal and/or replacement of the flow restricting insert from the coupling body. FIG. 14A illustrates an exemplary flow restricting element 640a with a two-piece body including a male threaded gland 643a joined with a female threaded connector 644a to form the coupling body 642a. A flow restricting insert 641a, defining a flow restriction or orifice 615a is received in a recess in the connector 644a, and the exemplary gland 643a includes a face seal O-ring 645a that seals against the retainer body recess and the insert. The gland 643a retains a female threaded zero clearance fitting nut 648a for connecting with a male threaded zero clearance fitting body on a first body member of the flow restricting device, and the retainer body defines a male threaded zero clearance fitting body 649a for connecting with a female threaded zero clearance fitting nut on a second body member of the flow restricting device. To repair (e.g., clean) or replace the flow restricting insert 641a, the fitting nut 648a is unthreaded from the male threaded fitting body of the device (not shown), and the connector 644a is unthreaded from the female threaded nut of the device (not shown) to remove the flow restricting element subassembly 640a from the device. The gland 643a is then unthreaded from the connector 644a for removal and repair/reinstallation or replacement of the flow restricting insert 641a. Alternatively, the entire flow restriction element subassembly 640a may be replaced.

Figure 14C:
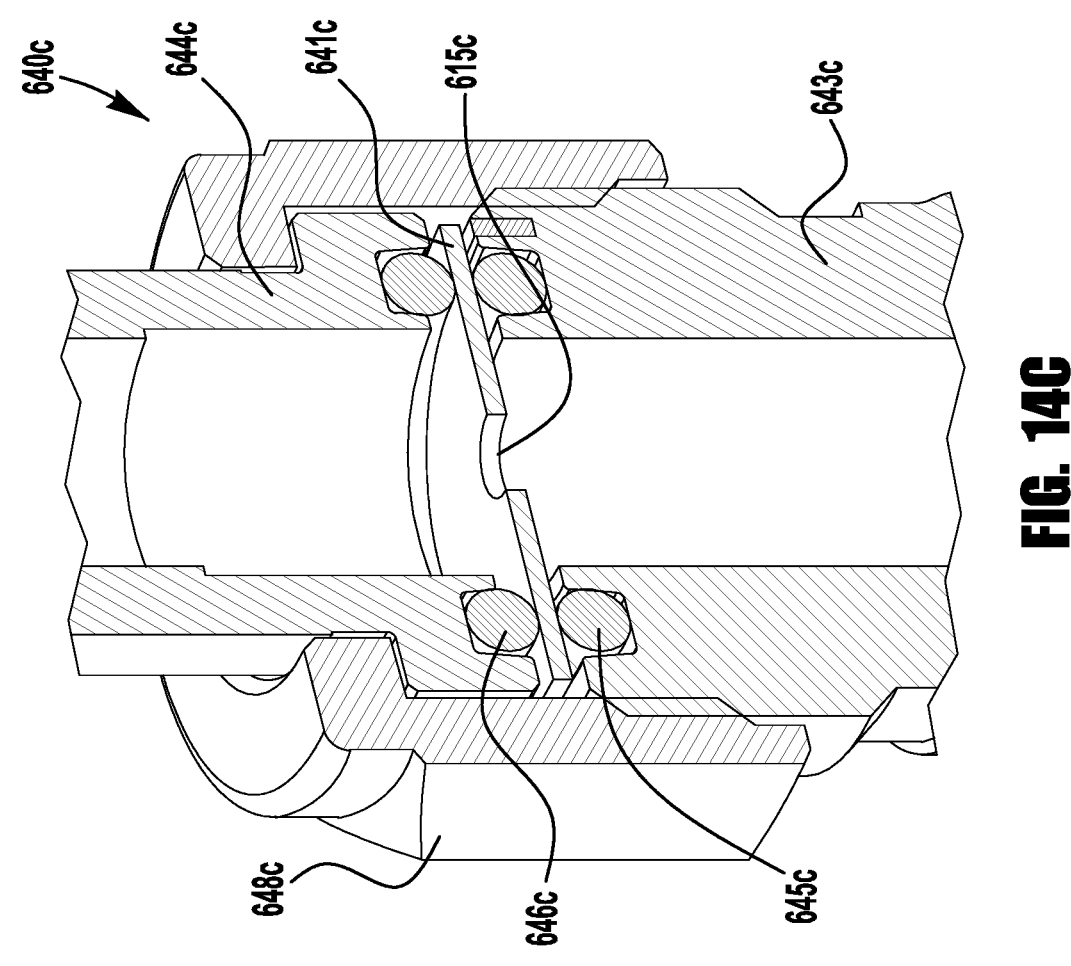
Figure 14B:
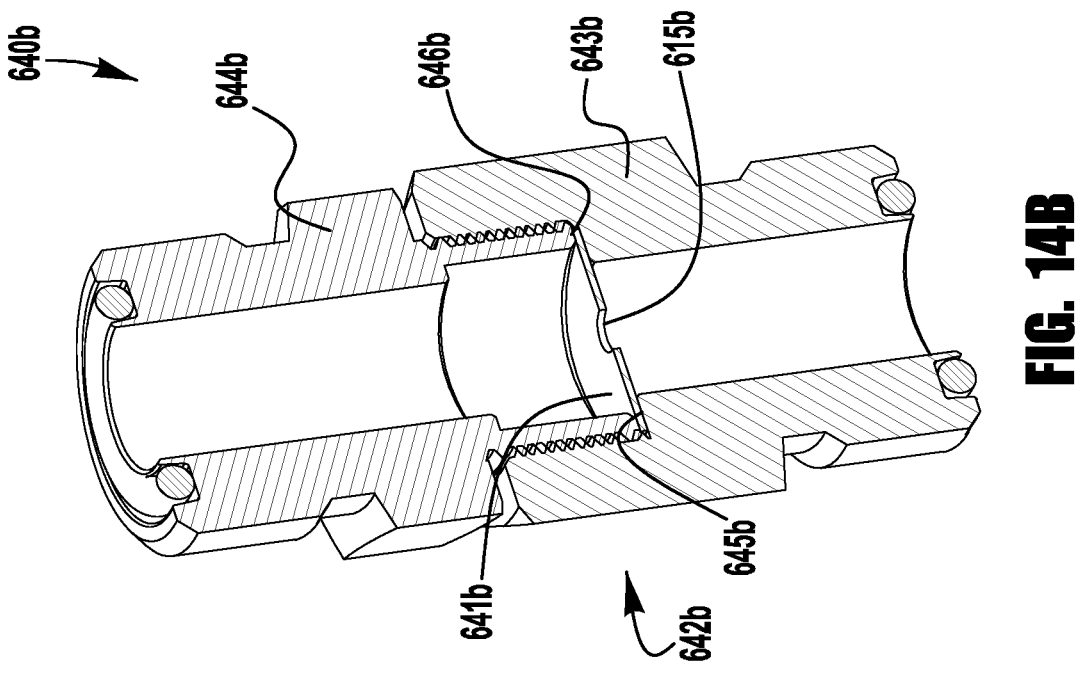

FIG. 14B illustrates another exemplary flow restricting element 640b having a two-piece body 642b including a first male threaded zero clearance connector 643b having a female threaded (e.g., NPT threads) end and a second male threaded zero clearance connector 644b having a mating male threaded (e.g., NPT threads) end joined with the female threaded end to form the coupling body. A flow restricting insert 641b defining a flow restricting orifice 615b is received in a recess in the first connector 643b, and may be secured against a counterbore portion 645b of the first connector by an end face 646b of the male threaded end of the second connector 644b. To repair (e.g., clean) or replace the flow restricting insert 641b, the first and second male connectors 643b, 644b are unthreaded from corresponding female threaded nuts (not shown) of the device to remove the flow restricting element subassembly 640b from the device. The first and second male connectors 643b, 644b may then be unthreaded from each other for removal and repair/reinstallation or replacement of the flow restricting insert 641b. Alternatively, the entire flow restriction element subassembly 640b may be replaced.

FIG. 14C illustrates an exemplary flow restricting element 640c with a two-piece arrangement including a male threaded zero clearance connector 643c joined with a gland 644c by a female threaded zero clearance nut 648c. A flow restricting insert 641c, defining a flow restricting orifice 615c, is received and sealed between a face seal O-ring 645c assembled with the male connector 643c (e.g., retained in an end face groove of the male threaded end) and a face seal 646c assembled with the gland 644c (e.g., retained in an end face groove of the gland). In an exemplary embodiment, the male connector 643c may be affixed with (e.g., welded to, coupled to, or integrally machined with) a first fitting body defining an first (e.g., inlet, outlet) port and a sensor retaining first (e.g., upstream, downstream) sensor port, and the gland may be affixed with (e.g., welded to, coupled to) a second fitting body defining a second (e.g., inlet, outlet) port and a sensor retaining second (e.g., upstream, downstream) sensor port. To repair (e.g., clean) or replace the flow restricting insert 641c, the female threaded nut 648c is unthreaded from the male threaded connector 643c, and the flow restricting insert 641c is slid out of engagement from the face seal O-rings 645c, 646c for repair/reinstallation or replacement of the flow restricting insert 641c.

Figures 14D, 14E:
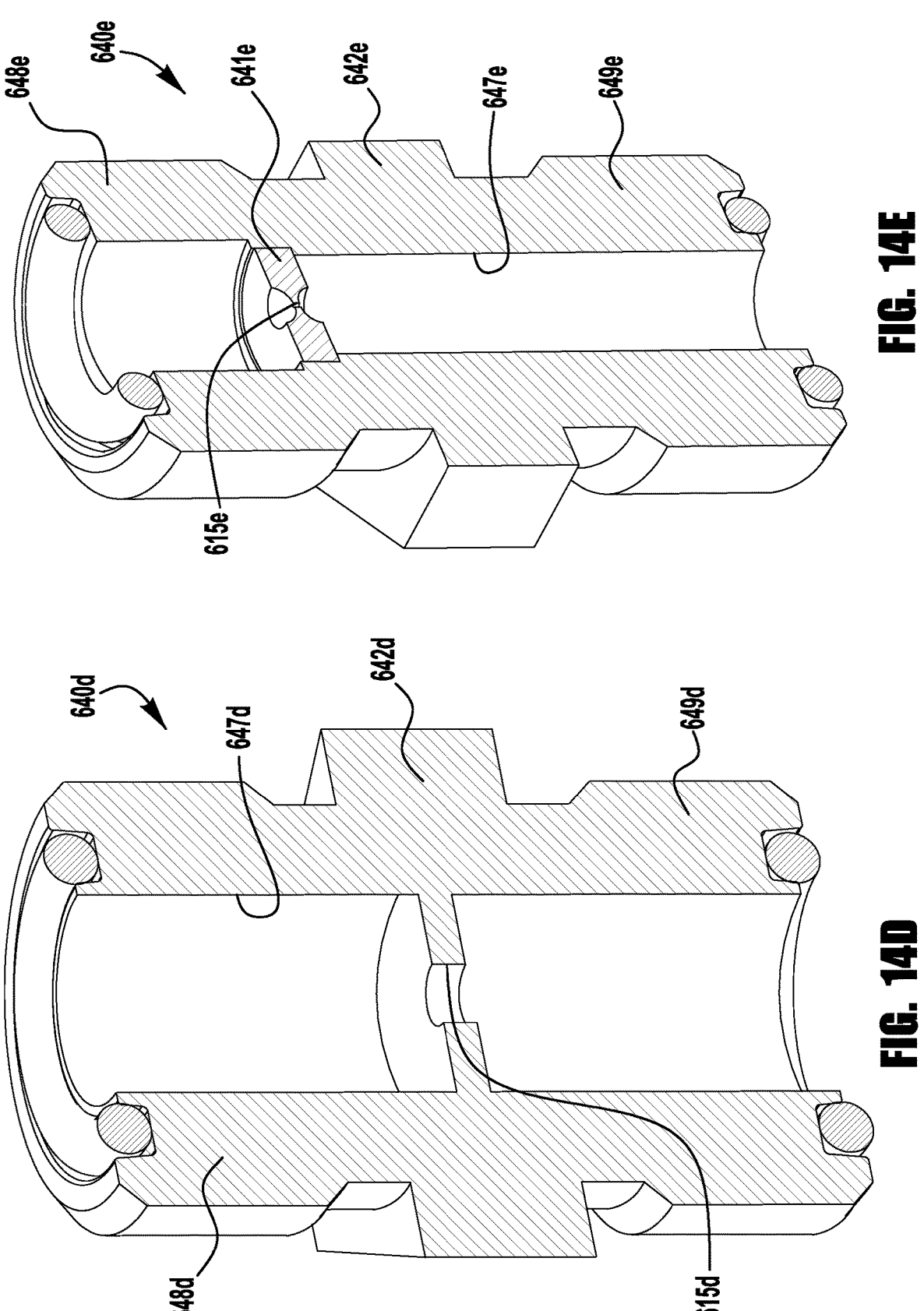

In other embodiments, the flow restricting element may be provided as a single piece body having a flow restriction assembled with or integral with the body. FIG. 14D illustrates an exemplary flow restricting element 640d with a single piece body 642d including first and second male threaded zero clearance connections 648d, 649d and a flow restriction 615d integrally formed along a through bore 647d (e.g., centrally located, as shown). To repair (e.g., clean) or replace the flow restriction 615d, the first and second male connections 648d, 649d are unthreaded from corresponding female threaded nuts (not shown) of the device to remove the flow restricting element 640d from the device.

Figure 14G:
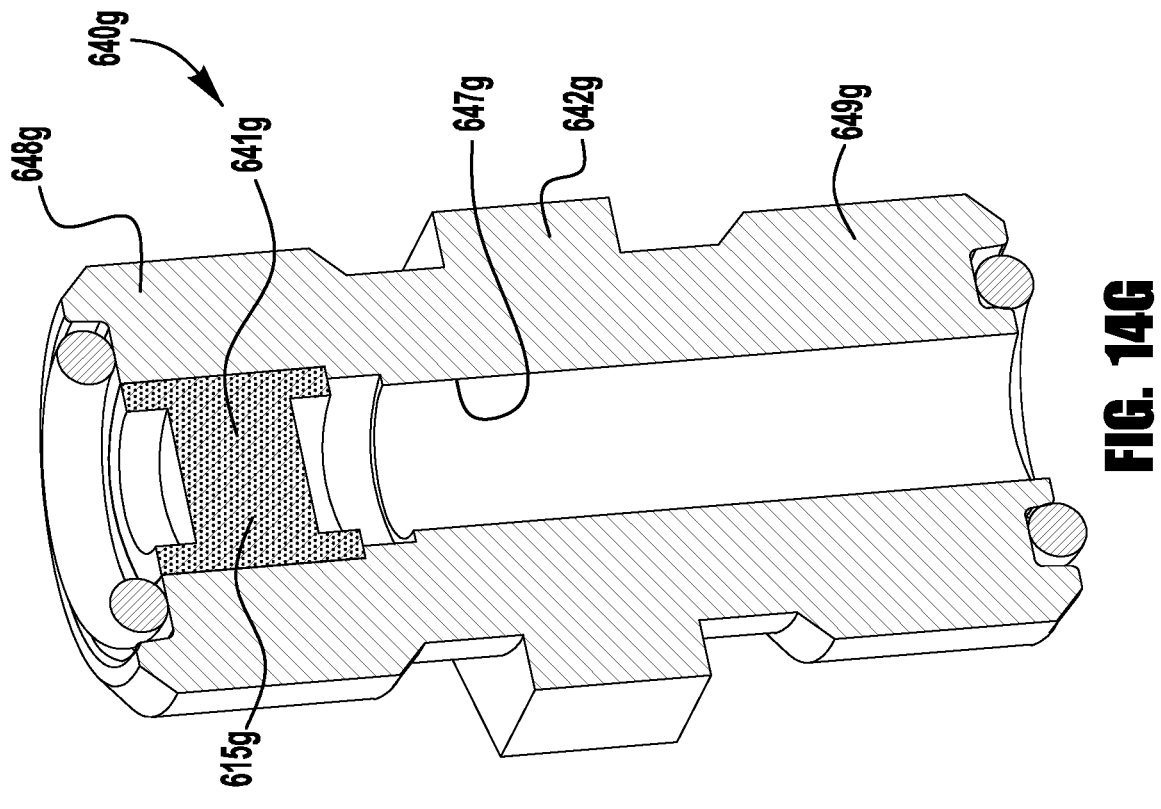
Figure 14F:
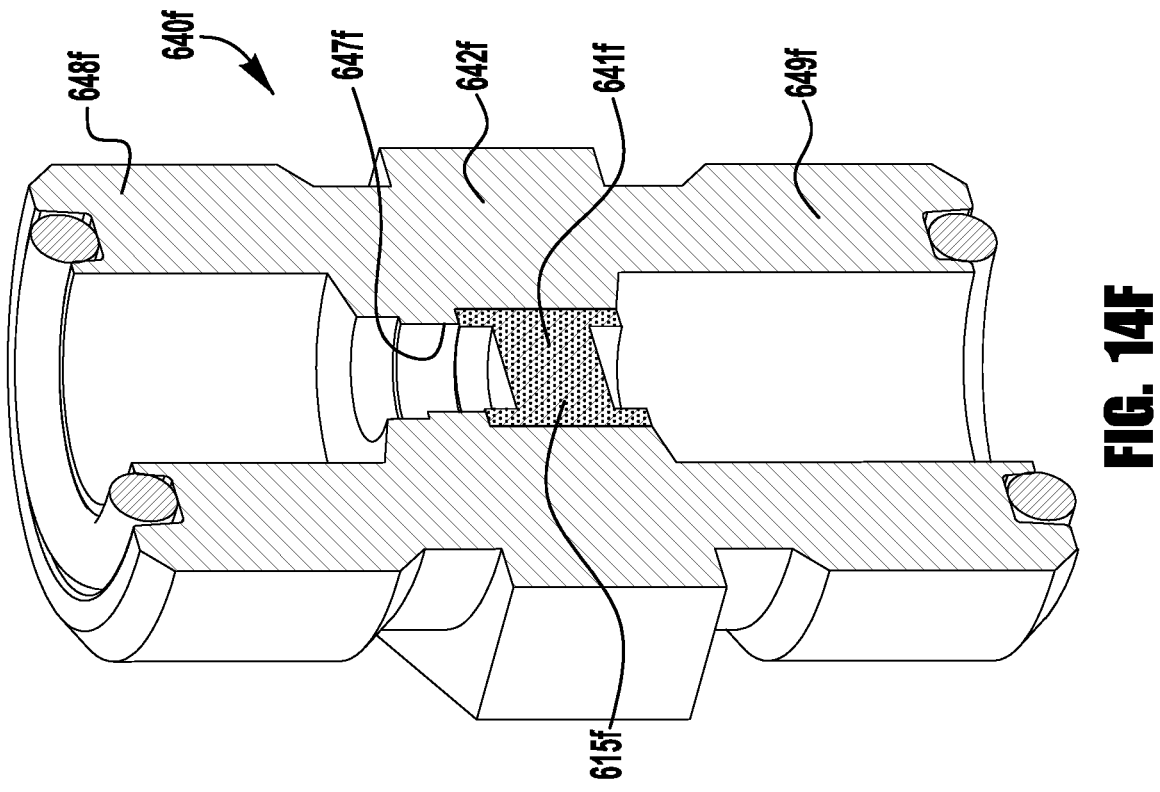
Figures 14H, 14I:
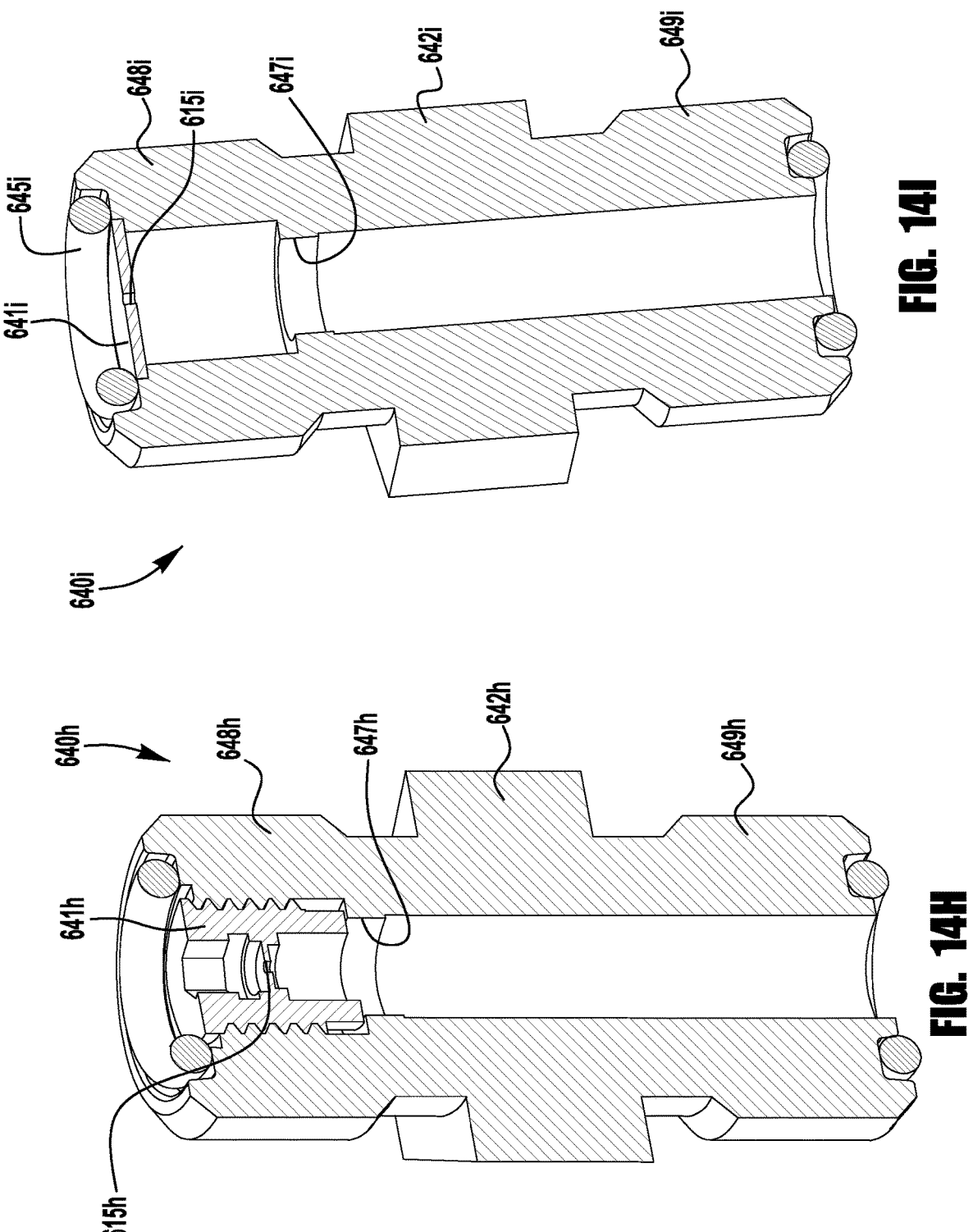

In other embodiments, a flow restricting insert may be assembled with a single piece flow restricting element body, for example, using a threaded engagement, press fit engagement, or retaining clip engagement, and may in some embodiments include a gasket or seal to prevent leakage between the flow restricting element body and an outer periphery of the insert. FIG. 14E illustrates an exemplary flow restricting element 640e with a single piece body 642e including first and second male threaded zero clearance connections 648e, 649e and a press-in orifice disc or aper- tured insert 641e (defining orifice 615e), installed in a through bore 647e of the body (e.g., seated against a counterbore in the through bore). FIG. 14F illustrates an exemplary flow restricting element 640f with a single piece body 642f including first and second male threaded zero clearance connections 648f, 649f and a press-in sintered element or porous insert 641f installed in a through bore 647f of the body (e.g., seated against a counterbore in the through bore) to define a porous flow path 615f. While the flow restricting insert may be positioned in a central portion of the through bore, between the end connections, as shown in FIGS. 14E and 14F, in other embodiments, the flow restrict- ing insert may be installed within at least one of the end connections, in an end portion of the through bore. FIG. 14G illustrates an exemplary flow restricting element 640g with a single piece body 642g including first and second male threaded zero clearance connections 648g, 649g and a press-in sintered element or porous insert 641g installed in an end portion of the through bore 647g, in the first end connection 648g (e.g., seated against a counterbore in the through bore) to define a porous flow path 615g. FIG. 14H illustrates an exemplary flow restricting element 640h with a single piece body 642h including first and second male threaded zero clearance connections 648h, 649h and a restrictor set screw or threaded apertured insert 641h (defin- ing orifice 615h) installed in a female threaded end portion of the through bore 647h, in the first end connection 648h. FIG. 14I illustrates an exemplary flow restricting element 640i with a single piece body 642i including first and second male threaded zero clearance connections 648i, 649i and an orifice disc or apertured insert 641i (defining orifice 615i) installed in an end face counterbore of the through bore 647i, in the first end connection 648i (e.g., snap fit or press fit). In one such embodiment, the o-ring seal 645i of the first end connection 648i provides a seal between the outer periphery of the orifice disc 641i and the counterbore.

To repair (e.g., clean) or replace the flow restricting inserts 641e-h, the first and second male connections 648e-h, 649e-h are unthreaded from corresponding female threaded nuts (not shown) of the device to remove the flow restricting element 640e-h from the device. The insert 641e-h may be removed (e.g., unthreaded, pressed) from the body 642e-h for cleaning or replacement. Alternatively, the entire flow restricting element 640e-h may be replaced.

Referring back to FIG. 14, the exemplary fluid monitoring module 600 includes an enclosure (shown schematically at 601) affixed to (e.g., at least partially enclosing) the flow sensing device 605 and enclosing a controller, shown sche- matically at 650 (which may be similar to the controller 550 of the embodiments of FIGS. 10A-13C). The sensors 620, 630 are connected (e.g., by wiring within the module enclo- sure) to the controller 650 to transmit pressure and tempera- ture indicating signals to the controller. The controller 650 is configured to process the pressure and temperature indicat- ing signals, for example, to determine pressure, temperature, and/or flow rate of fluid passing through the flow sensing device, and/or to provide a measured output of any one or more of these parameters. Similar to the exemplary embodi- ment of FIGS. 10A-13C, the module 600 may additionally be provided with one or more of: one or more internal batteries 660; a wireless transmitter (e.g., provided on a circuit board of the controller 650) for wirelessly transmitting fluid data to a remote device; an external antenna 655, electrically connected with the controller transmitter, for enhanced wireless communication with a remote device; a user interface, such as, for example, one or more knobs, switches or buttons, for example, to turn on the controller, to turn off the controller, or to commission/synchronize the controller, and one or more display elements (e.g. indicator LEDs and/or display screen), as described in greater detail above.

The enclosure 601 may be provided with a cover or lid (not shown) to selectively enclose the flow sensing device 605, while being movable or removable for exposure of the flow sensing device, for example, to facilitate removal and/or replacement of the flow restricting element.

Figure 15:
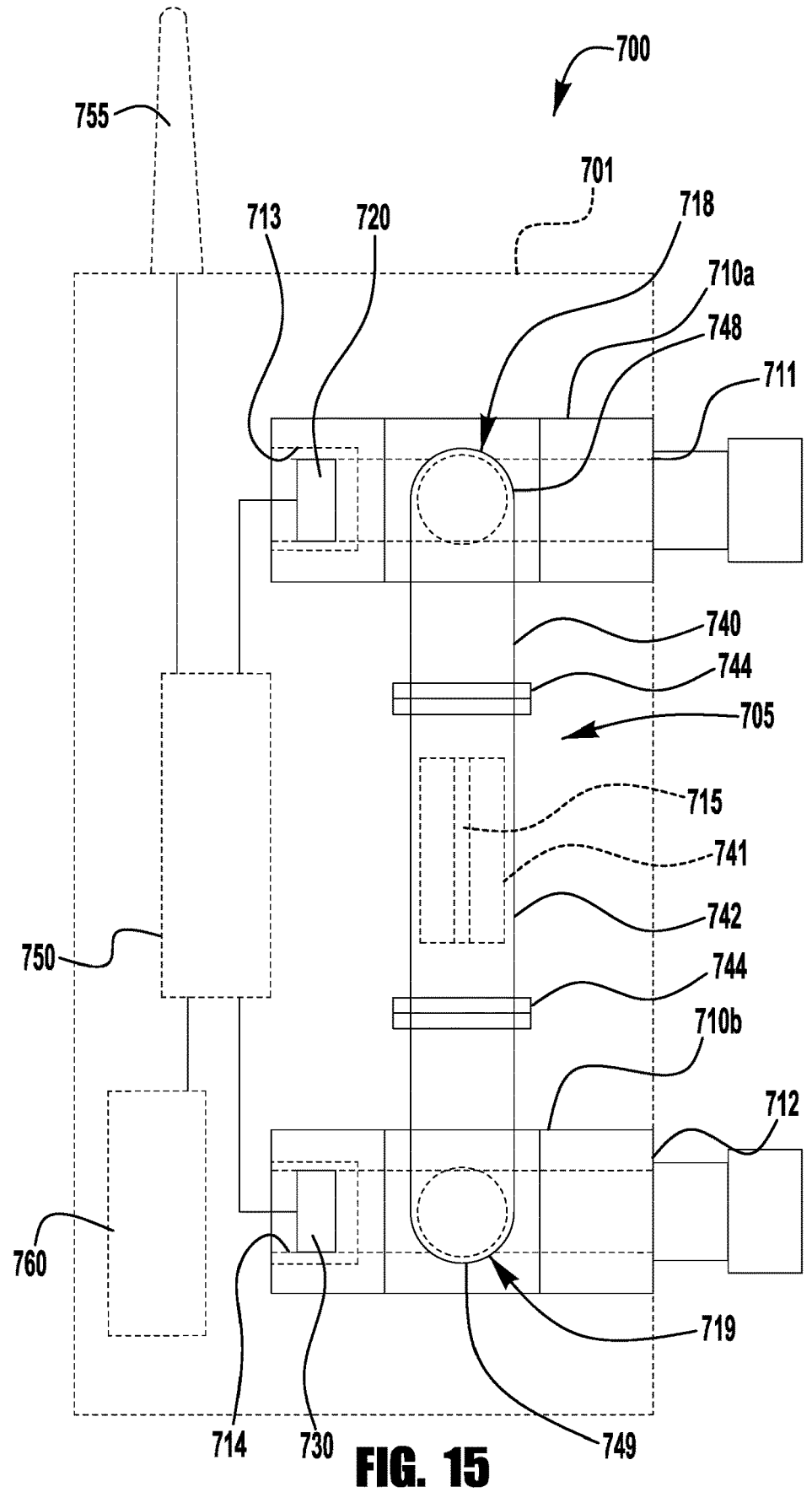
FIG. 15 is a schematic view of another fluid monitoring module, in accordance with another aspect of the present disclosure.

Still other arrangements may be utilized to facilitate removal and/or replacement of a flow restricting element from a flow sensing device. FIG. 15 schematically illustrates a fluid monitoring module 700 including a flow sensing device 705 having first and second T-shaped body members 710a, 710b including first run ports defining laterally out- ward extending inlet and outlet ports 711, 712, second run ports defining laterally inward extending upstream and downstream sensor ports 713, 714 (retaining upstream and downstream sensors 720, 730), and branch ports defining laterally extending first and second connections 718, 719, perpendicular to the inlet/outlet and sensor ports 711, 712 (i.e., extending outward from the drawing sheet), 713, 714, for connecting with first and second end laterally extending connectors 748, 749 of a U-shaped flow restricting element 740. The U-shaped flow restricting element 740 includes an axially extending portion defining one or more flow restrict- ing passages 715, which may be formed, for example, in one or more inserts 741 (e.g., plugs, plates, etc.) retained in a U-shaped coupling body 742 to which the first and second end connections 748, 749 are attached (e.g., by welding or integrally forming). The coupling body 742 may be provided as a multiple piece assembly including one or more con- nectors 744 detachable to facilitate removal and/or replace- ment of the insert 741 from the coupling body. In one embodiment, the flow restricting insert(s) may be removable from the coupling body for replacement with alternative flow restricting inserts providing different flow rates, flow paths, materials, or other such properties. In other embodi- ments, the flow restricting component may be integrally or monolithically formed with the coupling body, such that the entire flow restricting element is replaced.

The U-shaped configuration of the flow restricting ele- ment 740 may facilitate removal from the flow sensing device 705 and may facilitate the use of end connections that are not zero-clearance connections (e.g., fittings that do not use elastomeric seals, for example, to allow for a wider range of system conditions), including, for example, tube fittings, quick disconnect fittings, and push-to-connect fit- tings.

According to another aspect of the present disclosure, a fluid monitoring module may be provided with a flow sensing device arranged such that at least a flow restricting element of the flow sensing device is external to a housing of the fluid monitoring module, for example, to facilitate removal of the flow restricting element without removing, disassembling, or otherwise adjusting the module housing. As one example, as shown in FIG. 16A, a fluid monitoring module 400a may be provided with a flow sensing device 405a having first (e.g., upstream) and second (e.g., down- stream) sensor ports 413a, 414a mounted to the module enclosure 401a for electrical connection of retained sensors (which may be similar to the sensors 120, 130, 520, 530 of the embodiments of FIGS. 1-13C) to a controller enclosed within the module enclosure 401*a*, such that the flow restricting element 440*a* (e.g., any of the exemplary flow restricting elements 640*a-i* of FIGS. 14A-I) is disposed external to the module enclosure 401*a*, for example, to facilitate removal and replacement/repair of the flow restricting element 440*a*.

Figure 16B:
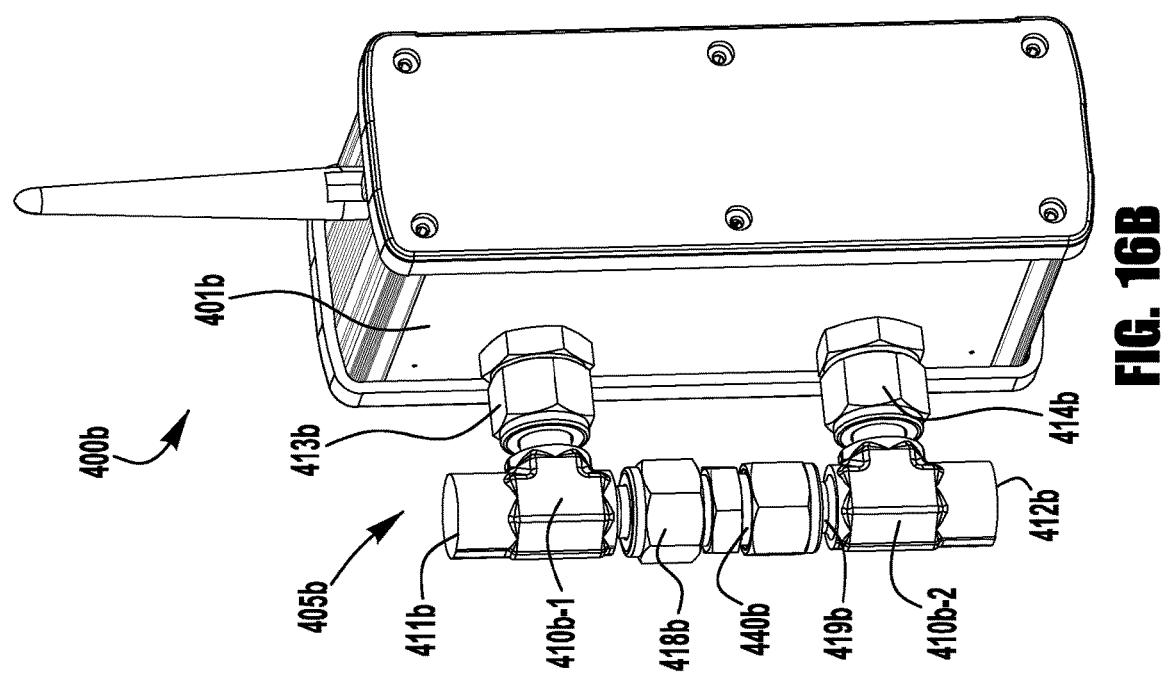
FIG. 16B is a side view of another exemplary wireless fluid monitoring module having an external flow restricting element, in accordance with another aspect of the present disclosure.
Figure 16A:
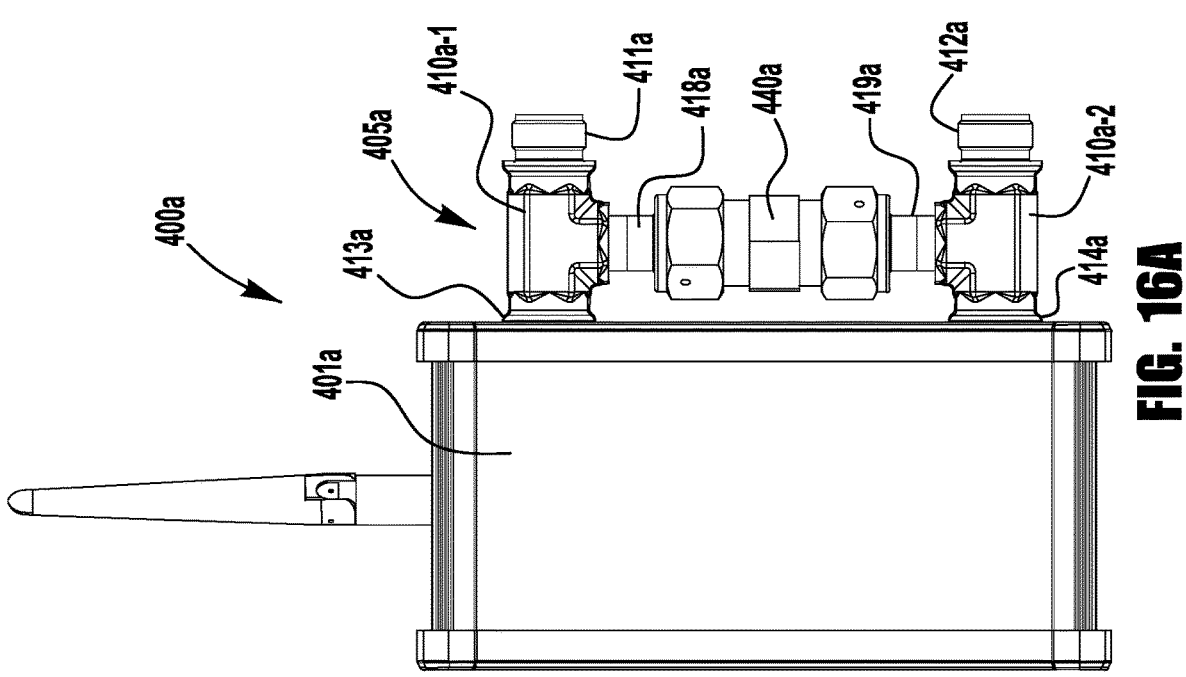
FIG. 16A is a side view of an exemplary wireless fluid monitoring module having an external flow restricting element, in accordance with another aspect of the present disclosure.

In the embodiment of FIG. 16A, the flow sensing device 405*a* includes first and second T-shaped body members 410*a*-1, 410*a*-2 including first run ports defining laterally outward extending inlet and outlet ports 411*a*, 412*a*, second run ports defining the laterally inward extending sensor ports 413*a*, 414*a*, and branch or connecting ports defining axially extending first and second restrictor connections 418*a*, 419*a* for connecting with the flow restricting element 440*a*. As described above, the restrictor connections 418*a*, 419*a* may be zero-clearance connections to facilitate removal of the flow restricting element 440*a*.

In another exemplary arrangement, as shown in FIG. 16B, a fluid monitoring module 400*b* includes an externally mounted flow sensing device 405*b* having first and second T-shaped body members 410*b*-1, 410*b*-2 including first run ports defining axially extending inlet and outlet ports 411*b*, 412*b*, second run ports defining axially extending first and second restrictor connections 418*b*, 419*b* for connecting with the flow restricting element 440*b* (e.g., any of the exemplary flow restricting elements 640*a-i* of FIGS. 14A-I), and branch or connecting ports defining laterally inward extending sensor ports 413*b*, 414*b* mounted to the module enclosure 401*b* for electrical connection of the retained sensors (which may be similar to the sensors 120, 130, 520, 530 of the embodiments of FIGS. 1-13C) to a controller enclosed within the module enclosure 401*b*.

Figures 16C, 16D:
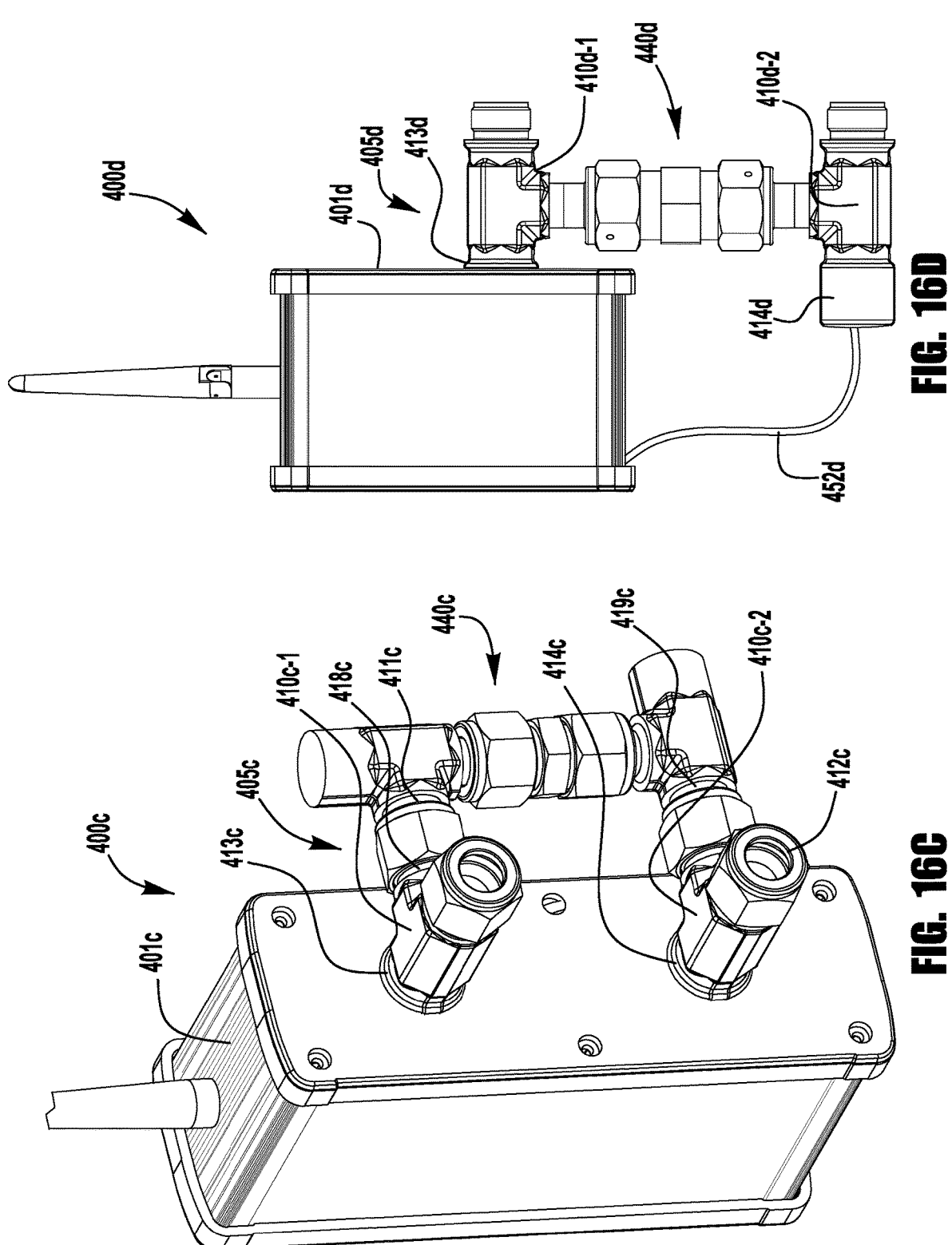
FIG. 16C is a side view of another exemplary wireless fluid monitoring module having an external flow restricting element, in accordance with another aspect of the present disclosure.
FIG. 16D is a side view of another exemplary wireless fluid monitoring module having an external flow restricting element, in accordance with another aspect of the present disclosure.

In another exemplary arrangement, as shown in FIG. 16C, a fluid monitoring module 400*c* includes an externally mounted flow sensing device 405*c* having first and second T-shaped body members 410*c*-1, 410*c*-2 including first run ports defining laterally outward extending inlet and outlet ports 411*c*, 412*c*, second run ports defining laterally inward extending first and second (e.g., upstream and downstream) sensor ports 413*c*, 414*c* mounted to the module enclosure 401*c* for electrical connection of the retained sensors (which may be similar to the sensors 120, 130, 520, 530 of the embodiments of FIGS. 1-13C) to a controller enclosed within the module enclosure 401*c*, and branch ports defining perpendicular laterally extending first and second restrictor connections 418*c*, 419*c* for connecting with a U-bend flow restricting element 440*c* (which may be similar to the flow restricting element 740 of FIG. 15).

Figure 17:
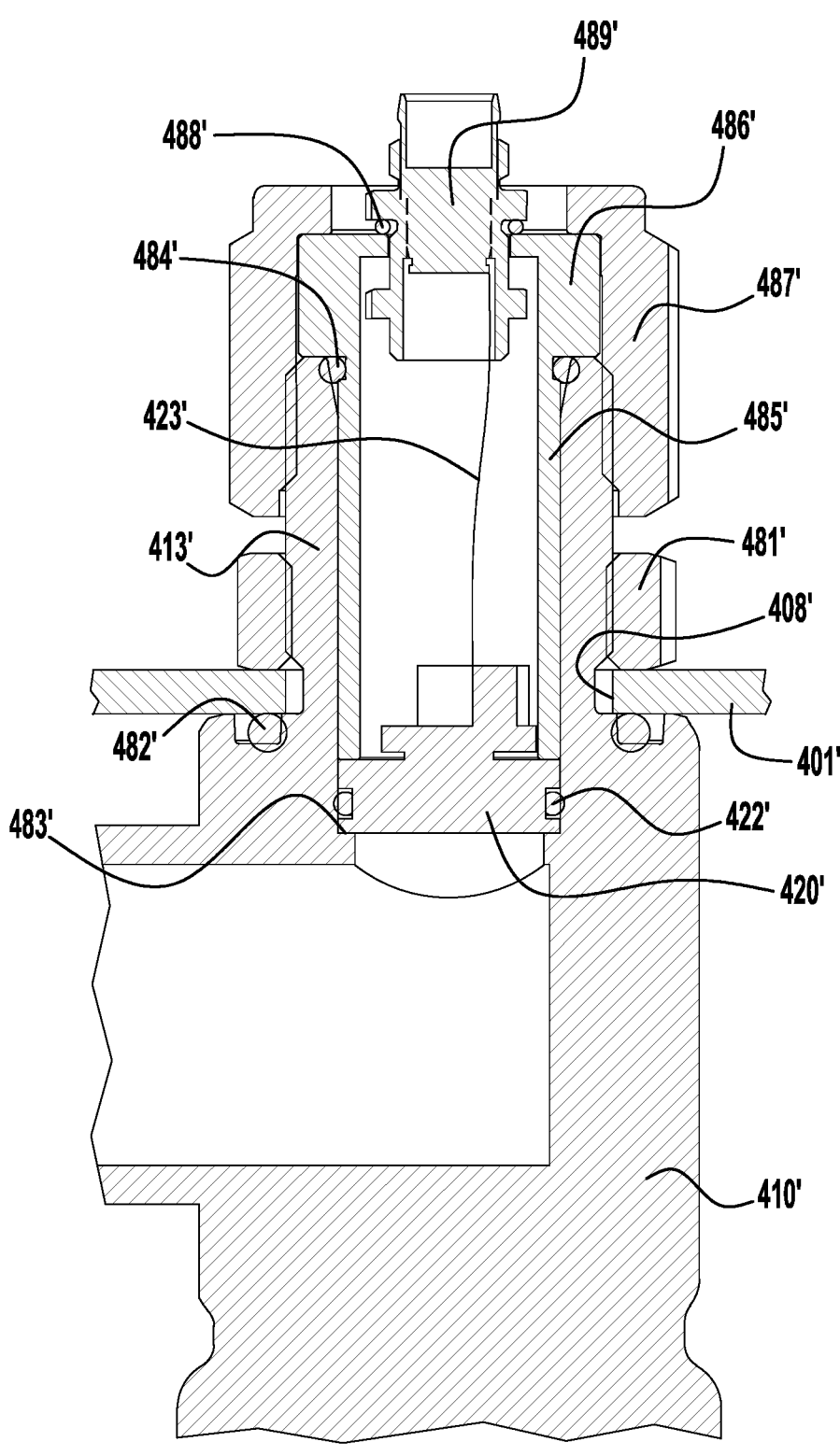
FIG. 17 is a side cross-sectional view of an exemplary sensor port mounting arrangement for a wireless fluid monitoring module having an external flow restricting element.

Many different arrangements may be utilized to mount the sensor ports of the flow sensing device to the module enclosure. FIG. 17 illustrates an exemplary arrangement including a flow sensing device body member 410' including a male threaded sensor port or connector 413' received through a mounting aperture 408' in the module enclosure 401' and secured against the module enclosure by a panel nut 481' threaded with the male connector 413'. A sensor 420' is installed in the sensor port connector 413' and is secured against a counterbore 483' by a retaining collar 485' extending through the sensor port 413' to engage a surface of the sensor 420'. A fitting nut 487' is threadably assembled with the male connector 413' to secure an end portion 486' of the retaining collar 485', and a wire connector 489' (e.g., M8 connector) is installed in a central bore in the retaining collar end portion 486' to provide a connection between wiring 423' from the sensor 420' and the controller (not shown). Gasket seals 482', 484', 488' (e.g., O-ring seals) may be provided between the body member 410' and module enclosure 401', between the retaining collar 485' and male connector 413', and between the male connector 413' and wire connector 489', for example, to seal the module enclosure 401' from moisture or other contamination. A gasket seal 422' (e.g., seal) around the sensor 420' provides a leak tight seal to prevent system fluid leakage past the sensor 420'.

In other exemplary arrangements, as illustrated, for example, in FIG. 16D, a fluid monitoring module 400*d* may be provided with a flow sensing device 405*d* having a first body member 410*d*-1 with a first (e.g., upstream) sensor port 413*d* mounted to the module enclosure 401*d* (e.g., using the arrangement of FIG. 17) for electrical connection of a retained sensor (e.g., as described above) to a controller enclosed within the module enclosure 401*d*, and a second body member 410*d*-2 with a second (e.g., downstream) sensor ports 414*d* spaced apart from the module enclosure and retaining a sensor (e.g., as described above) electrically connected (e.g., by flexible wiring 452*d* extending from the second sensor port 414*d* to the module enclosure 401*d*) to a controller enclosed within the module enclosure 401*d*, such that the flow restricting element 440*d* is disposed external to the module enclosure 401*d*, for example, to facilitate removal and replacement/repair of the flow restricting element 440*d*. The single sensor port mount arrangement may allow for use of different sized flow restricting elements (e.g., different offset dimensions between the sensor ports, different lengths of flow restrictions) and/or different sized module enclosures. Additionally, the single sensor port mount arrangement may facilitate removal of the flow restricting element 440*d* from the flow sensing device 405*d* without using zero clearance connections (e.g., to eliminate polymeric seals in the connections), as the second sensor port is not fixedly mounted.

Figures 16E, 18A:
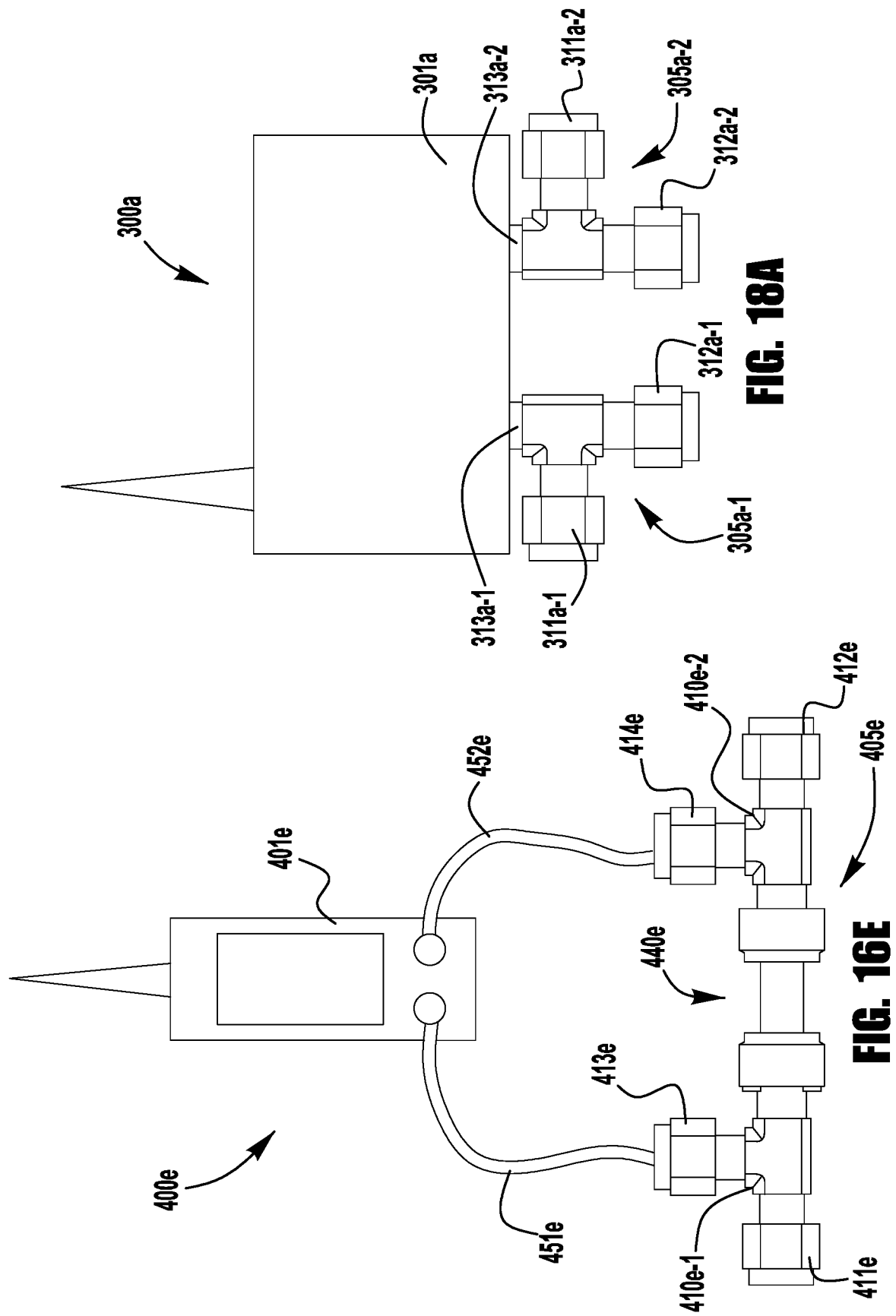
FIG. 16E is a side view of another exemplary wireless fluid monitoring module having an external flow restricting element, in accordance with another aspect of the present disclosure.
FIG. 18A is a side view of an exemplary wireless fluid monitoring module having a dual fluid monitoring arrangement, in accordance with another aspect of the present disclosure.

In still other exemplary arrangements, as illustrated, for example, in FIG. 16E, a fluid monitoring module 400*e* may be provided with a flow sensing device 405*e* having first and second body members 410*e*-1, 410*e*-2 defining inlet and outlet ports 411*e*, 412*e*, and first and second (e.g., upstream and downstream) sensor ports 413*e*, 414*e* spaced apart from the module enclosure 401*e* and retaining sensors (e.g., as described above) electrically connected (e.g., by flexible wiring 451*e*, 452*e* extending from the first and second sensor ports 413*e*, 414*e* to the module enclosure 401*e*) to a controller enclosed within the module enclosure 401*e*, such that the flow restricting element 440*e* is disposed external to the module enclosure 401*e*, for example, to facilitate removal and replacement/repair of the flow restricting element 440*e*. The detached or remote, wire connected sensor port arrangement may allow for use of different sized flow restricting elements (e.g., different offset dimensions between the sensor ports, different lengths of flow restrictions) and/or different sized module enclosures. Additionally, the wire connected sensor port arrangement may facilitate removal of the flow restricting element 440*e* from the flow sensing device 405*e* without using zero clearance connections (e.g., to eliminate polymeric seals in the connections), as the sensor ports are not fixedly mounted and thus easily moveable with respect to each other. Additionally, in one such configuration, the module 400*e* may be configured to easily disconnect from the sensor wiring 451*e*, 452*e*, for example, to allow use of the monitoring module with multiple flow sensing devices or to perform maintenance on the monitoring module.

According to another aspect of the present disclosure, a fluid monitoring module may be configured or adapted to provide separate sensing of fluid conditions in multiple fluid lines, or at multiple locations in a single fluid line, for example, to monitor changes in pressure over time (e.g., as an indication of filter or fluid line contamination). In one such arrangement, the flow restriction may be eliminated, with the flow sensing arrangement providing separate sensor engaging flow paths. As one example, as shown in FIG. 18A, a fluid monitoring module 300a may be provided with separate first and second sensing devices 305a-1, 305a-2 having first and second (e.g., inlet and outlet) ports 311a-1, 311a-2, 312a-1, 312a-2 and first and second sensor ports 313a-1, 313a-2 mounted to the module enclosure 301a for electrical connection of retained sensors (as described above) to a controller enclosed within the module enclosure 301a.

Figures 18B, 18C:
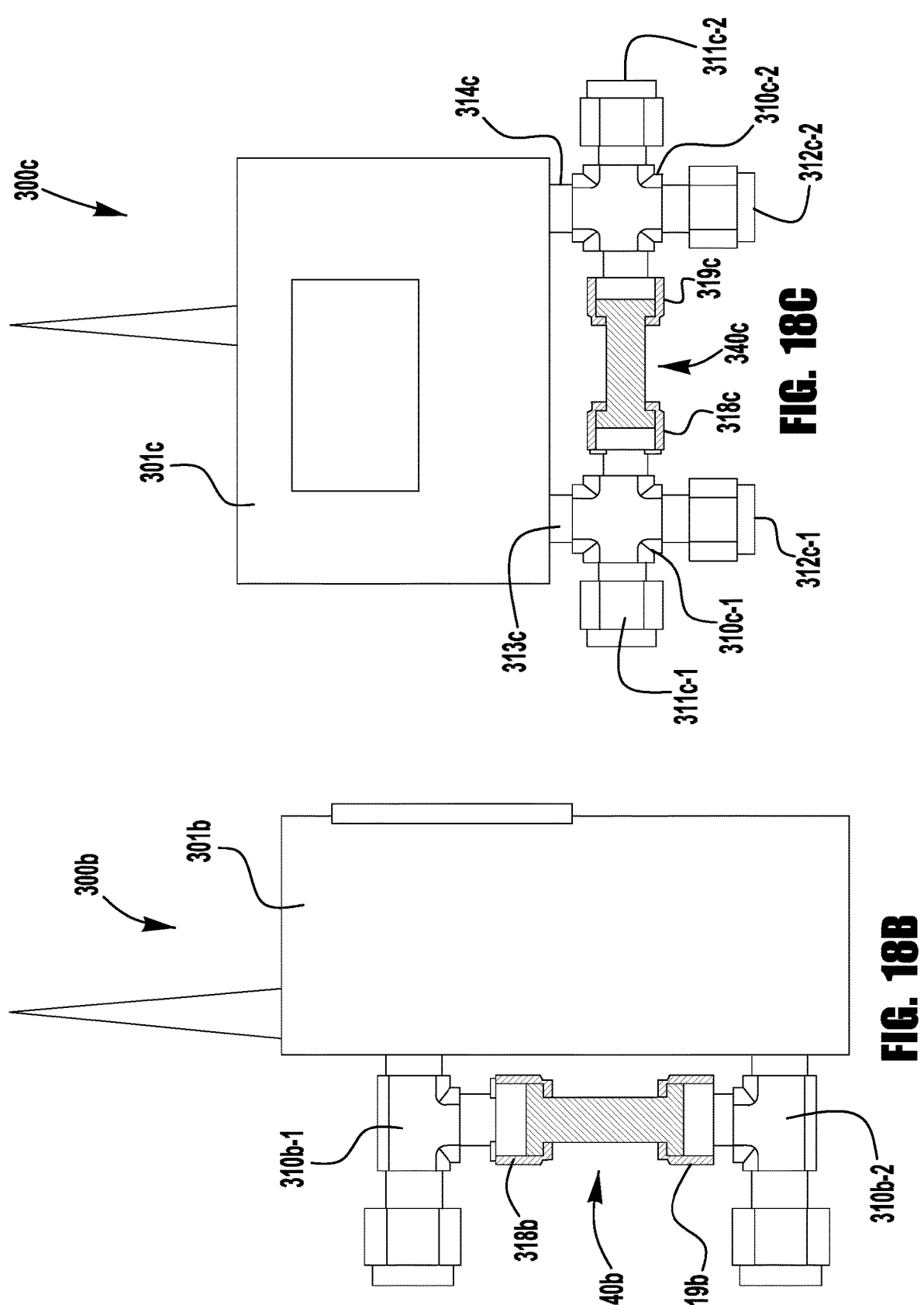
FIG. 18B is a side view of another exemplary wireless fluid monitoring module having a dual fluid monitoring arrangement, in accordance with another aspect of the present disclosure.
FIG. 18C is a side view of another exemplary wireless fluid monitoring module having a dual fluid monitoring arrangement, in accordance with another aspect of the present disclosure.

As another example, a fluid monitoring module with an external flow restricting element may be converted to a fluid monitoring module having separate fluid sensing devices by separating the flow restriction with one or more blind or blank coupling members. FIG. 18B illustrates an exemplary fluid monitoring module 300b, similar to the fluid monitoring module 400a of FIG. 16A, except with the flow restricting element replaced with a fluid blocking blind or blank coupling 340b installed between connections 318b, 319b of first and second body members 310b-1, 310b-2, to provide two separate dead-leg fluid monitoring locations. Alternatively (not shown), separate plugs may be assembled to the opposed body member connections.

Figure 18E:
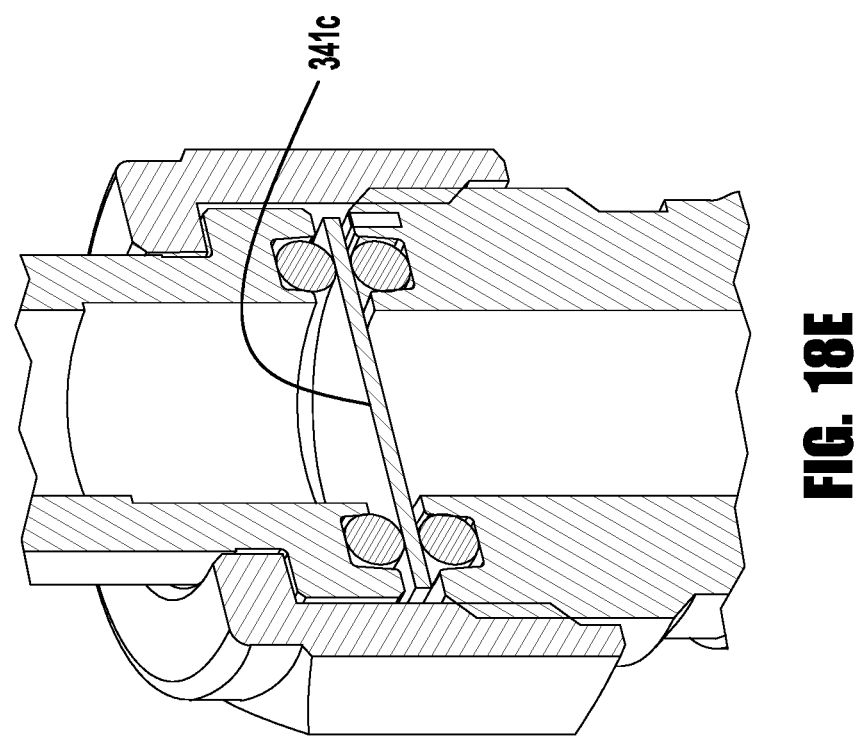
FIG. 18E is a cross-sectional perspective view of an exemplary coupling connection with blank disc insert, in accordance with another aspect of the present disclosure.
Figure 18D:
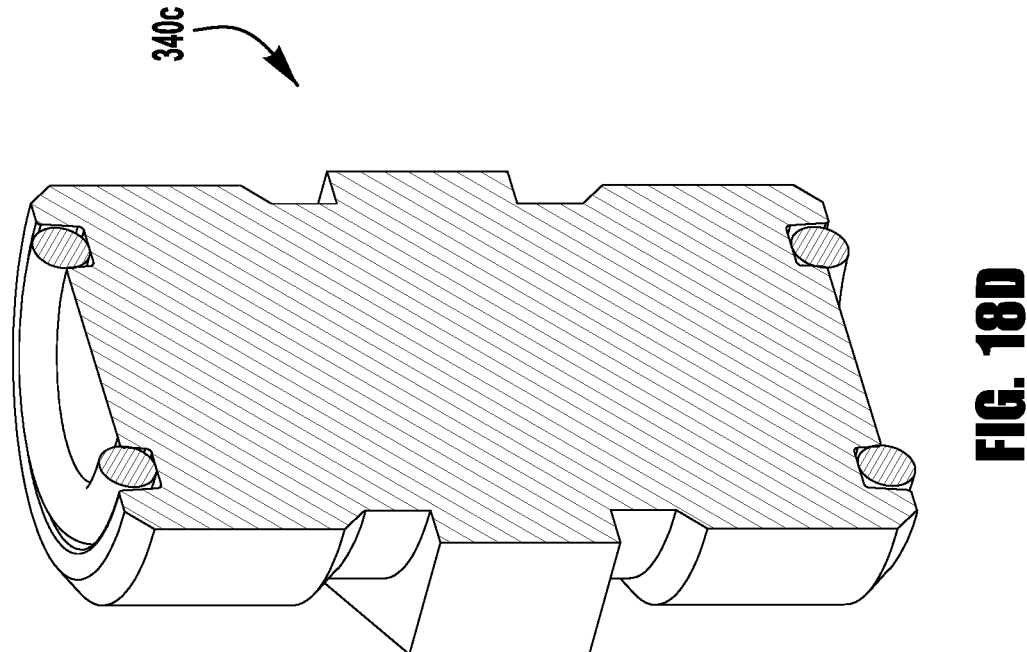
FIG. 18D is a cross-sectional perspective view of an exemplary blank coupling connection, in accordance with another aspect of the present disclosure.

FIG. 18C illustrates an exemplary fluid monitoring module 300c including first and second cross-shaped flow sensing bodies 310c-1, 310c-2, with sensor ports 313c, 314c mounted to the module enclosure 301c, first, axially outward extending ports 311c-1, 311c-2, second, laterally outward extending ports 312c-1, 312c-2, and axially inward extending restrictor connections 318c, 319c. To use the monitoring module 300c to monitor flow rate, a flow restricting element (e.g., any of the flow restricting elements 440a-h of FIGS. 14A-14I) may be assembled with the restrictor connections 318c, 319c, one of the ports 311c-1, 312c-1 of the first flow sensing body 310c-1 may be connected with a fluid inlet line, one of the ports 311c-2, 312c-2 of the second flow sensing body 310c-2 may be connected with a fluid outlet line, and the two unused ports may be plugged. To use the monitoring module 300c to monitor two separate fluid locations, a blank or blind coupling 340c (as shown, for example, in FIG. 18D) or blank/blind insert 341c (as shown, for example, in FIG. 18E) may be assembled with the restrictor connections 318c, 319c, one of the ports 311c-1, 312c-1, 311c-2, 312c-2 of each of the first and second flow sensing bodies 310c-1, 310c-2 may be connected with first and second fluid inlet lines, and the others of the ports of each of the first and second flow sensing bodies 310c-1, 310c-2 may be connected with first and second fluid outlet lines.

According to another aspect of the present disclosure, a fluid monitoring module may be configured to be provided as a separate, portable device that may be configured to be selectively connected to a fluid line for measurement of flow, temperature, and/or pressure conditions, thereby allowing for use of a single fluid monitoring module for multiple fluid lines.

Figure 19:
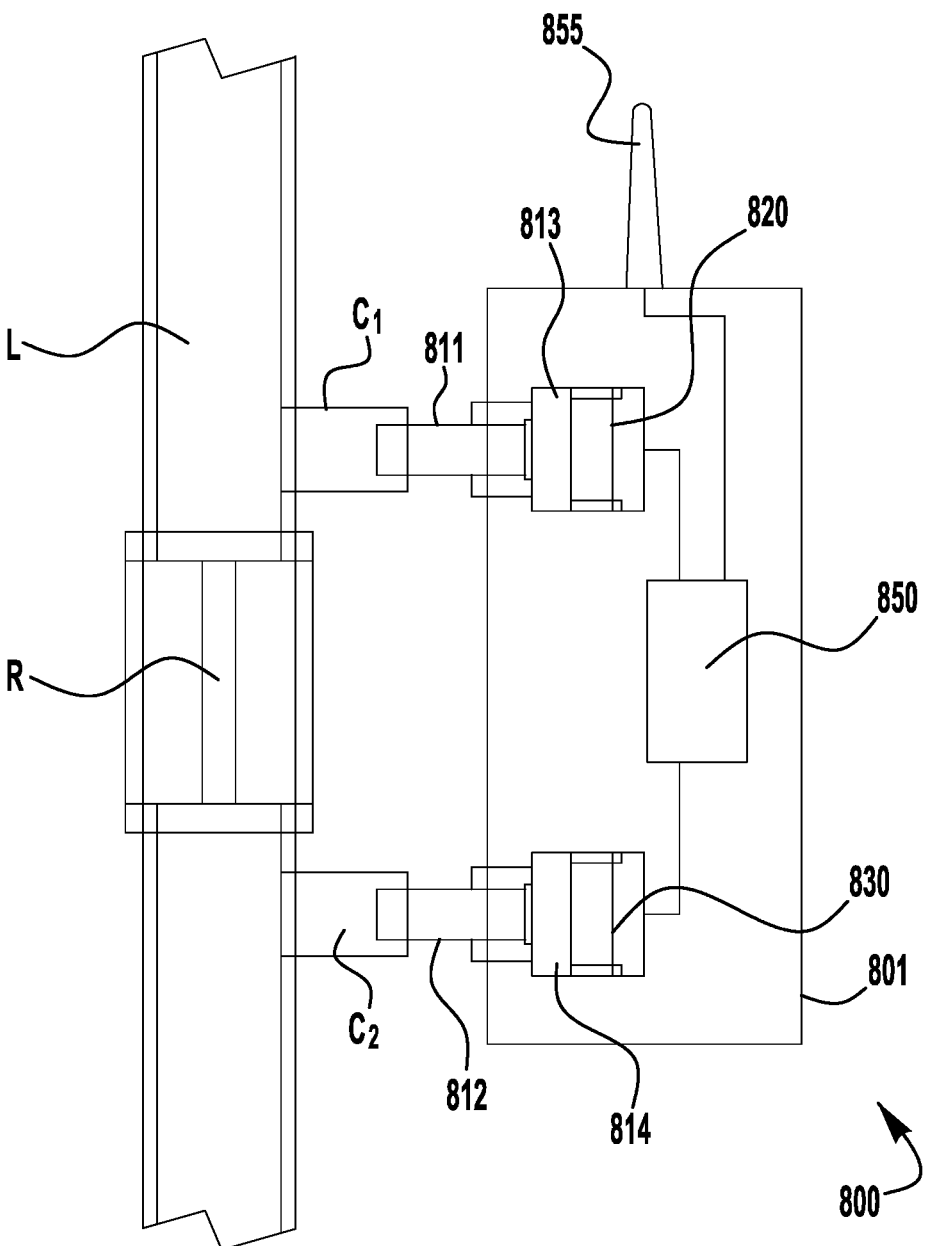
FIG. 19 is a schematic view of a fluid system with a portable fluid monitoring module, in accordance with another aspect of the present disclosure.

FIG. 19 illustrates an exemplary system including a fluid line L with an engineered flow restriction R (e.g., provided in a flow restricting coupling, valve, etc.), and a fluid monitoring module 800. The fluid line L includes branch connectors C1, C2 (e.g., quick disconnect couplings) upstream and downstream of the flow restriction R, for connection with sensor port connectors 811, 812 of upstream and downstream sensor ports 813, 814 (e.g., using mating quick disconnect couplings) of the fluid monitoring module 800. Upstream and downstream sensors 820, 830 (which may be similar to the sensors described above) are sealingly installed in the upstream and downstream sensor ports 813, 814, and are electrically connected to a controller 850 disposed in an enclosure 801 of the fluid monitoring module 800. Similar to the exemplary embodiments of FIGS. 10A-13C, the module 800 may additionally be provided with one or more of: one or more internal batteries; a wireless transmitter (e.g., provided on a circuit board of the controller 850) for wirelessly transmitting flow data to a remote device; an external antenna, electrically connected with the controller transmitter, for enhanced wireless communication with a remote device; a user interface, such as, for example, one or more knobs, switches or buttons, for example, to turn on the controller, to turn off the controller, or to commission/synchronize the controller, and one or more display elements (e.g. indicator LEDs and/or display screen), as described in greater detail above.

To monitor the flow conditions of the fluid line L, the upstream sensor port connector 811 is connected with the upstream fluid line branch connector C1 for measuring the pressure and/or temperature upstream of the flow restriction R, and the downstream sensor port connector 812 is connected with the downstream fluid line branch connector C2 for measuring the pressure and/or temperature downstream of the flow restriction R. Corresponding signals are transmitted from the sensors 820, 830 to the controller 850 for calculation and identification (e.g., through a user interface or communication of the data to a remote computer) of the pressure, temperature, flow rate, and/or other fluid conditions.

Figure 20:
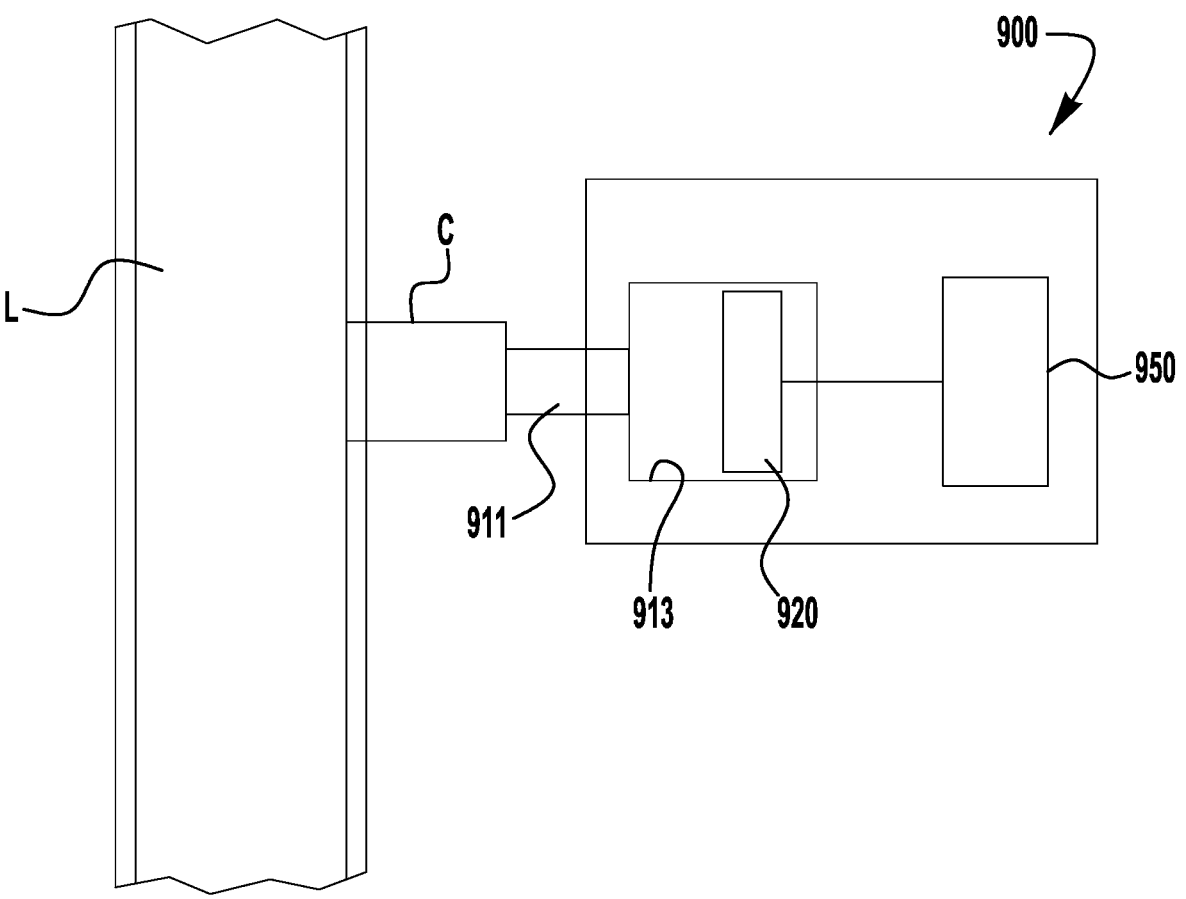
FIG. 20 is a schematic view of another fluid system with another portable fluid monitoring module, in accordance with another aspect of the present disclosure.

In another embodiment, a fluid monitoring module may be configured to measure only pressure and temperature of a fluid, and not flow rate. In such an arrangement, the module may be provided with a single sensor port and sensor. FIG. 20 illustrates an exemplary system including a fluid line L and a fluid monitoring module 900. The fluid line L includes a branch connector C (e.g., a quick disconnect coupling) for connection with a sensor port connector 911 of a sensor port 913 (e.g., using mating quick disconnect couplings) of the fluid monitoring module 900. A sensor 920 (which may be similar to the sensors described above) is sealingly installed in the sensor port 913 and is electrically connected to a controller 950 disposed in an enclosure 901 of the fluid monitoring module 900. Similar to the exemplary embodiments of FIGS. 10A-13C, the module 900 may additionally be provided with one or more of: one or more internal batteries; a wireless transmitter (e.g., provided on a circuit board of the controller 950) for wirelessly transmitting fluid data to a remote device; an external antenna, electrically connected with the controller transmitter, for enhanced wireless communication with a remote device; a user interface, such as, for example, one or more knobs, switches or buttons, for example, to turn on the controller, to turn off the controller, or to commission/synchronize the controller, and one or more display elements (e.g. indicator LEDs and/or display screen), as described in greater detail above. In another application, the single sensor monitoring module 900 may be used to sequentially measure pressure at an upstream branch connector C1 and at a downstream branch connector C2 (see FIG. 16) to sequentially measure pressure upstream and downstream of an engineered flow restriction R in the fluid line L, thereby enabling the controller 950 to calculate a flow rate in the fluid line by using only one sensor.

In another embodiment, a portable, selectively connectable fluid monitoring module may include a bypass flow path with a flow restricting passage between upstream and downstream sensor ports, thereby allowing for the elimination of the flow restriction from the fluid line, for example, to minimize contamination or erosion of the flow restriction.

Figure 21:
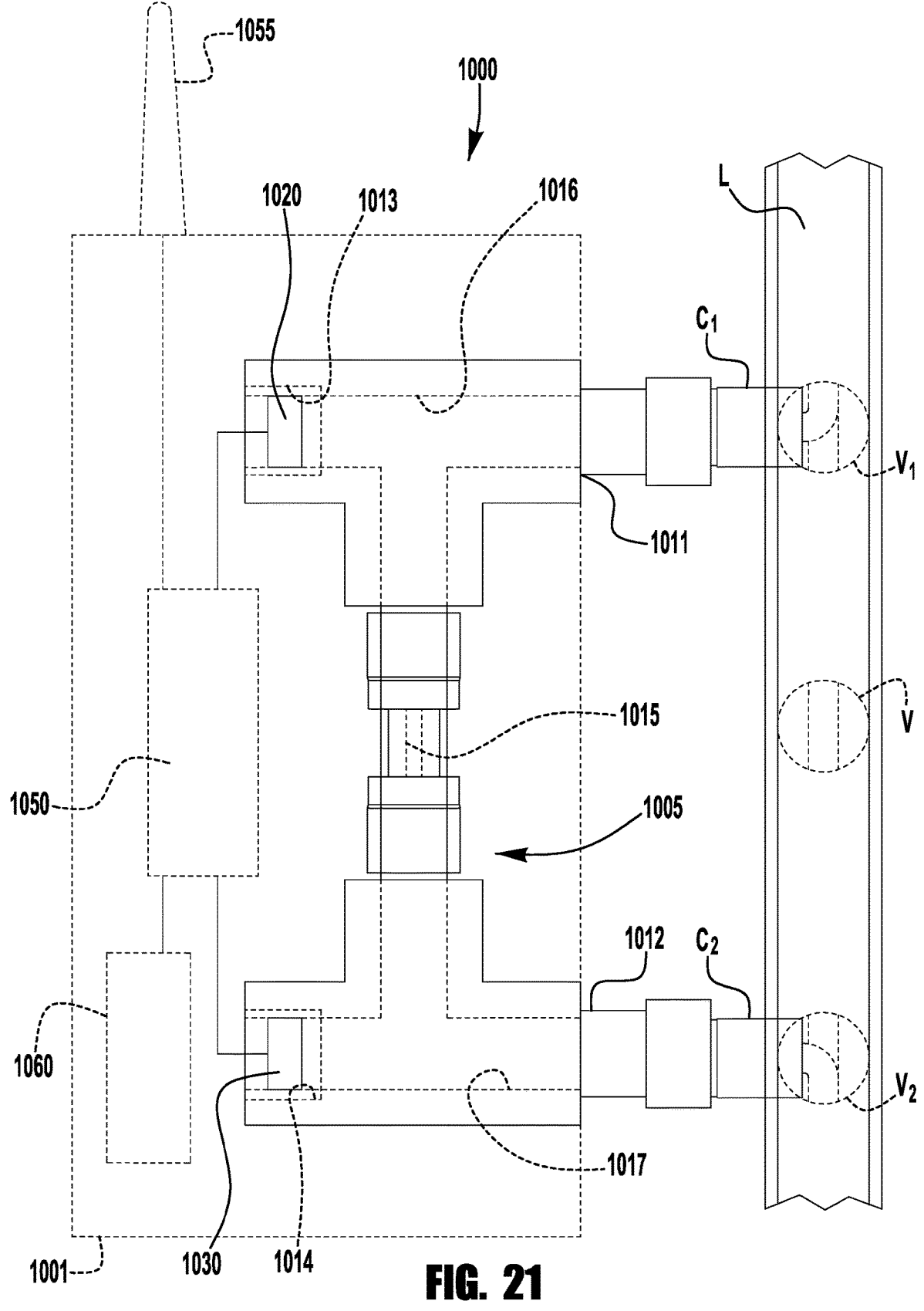
FIG. 21 is a schematic view of another fluid system with another portable fluid monitoring module, in accordance with another aspect of the present disclosure.

FIG. 21 illustrates an exemplary system including a fluid line L and a fluid monitoring module 1000. The fluid line L includes upstream and downstream branch connectors C1, C2 (e.g., quick disconnect couplings) for connection with inlet and outlet connectors 1011, 1012 (e.g., mating quick disconnect couplings) of the module 1000. The module 1000 further includes an upstream sensor port 1013 connected to the inlet connector 1011 by an upstream passage 1016, and a downstream sensor port 1014 connected to the outlet connector 1012 by a downstream passage 1017. Upstream and downstream sensors 1020, 1030 (which may be similar to the sensors described above) are sealingly installed in the upstream and downstream sensor ports 1013, 1014 and electrically connected to a controller 1050 disposed in an enclosure 1001 of the fluid monitoring module 1000. The upstream and downstream passages 1016, 1017 are connected by a flow restricting passage 1015. The inlet and outlet connectors 1011, 1012, upstream and downstream sensor ports 1013, 1014, internal passages 1016, 1017, and flow restricting passage 1015 may be provided in a flow sensing device 1005 assembled with the module enclosure 1001, as shown in the many exemplary embodiments described herein.

Similar to the exemplary embodiment of FIGS. 10A-13C, the module 1000 may additionally be provided with one or more of: one or more internal batteries; a wireless transmitter (e.g., provided on a circuit board of the controller 1050) for wirelessly transmitting flow data to a remote device; an external antenna, electrically connected with the controller transmitter, for enhanced wireless communication with a remote device; a user interface, such as, for example, one or more knobs, switches or buttons, for example, to turn on the controller, to turn off the controller, or to commission/synchronize the controller, and one or more display elements (e.g. indicator LEDs and/or display screen), as described in greater detail above.

To monitor the flow conditions of the fluid line L, the inlet connector 1011 of the module is connected with the upstream fluid line branch connector C1 and the outlet connector 1012 is connected with the downstream fluid line branch connector C2. A shutoff valve V may be disposed in the fluid line L between the upstream and downstream branch connectors C1, C2, and may be shut off to bypass all fluid line flow through the fluid monitoring module 1000. Alternatively, switching valves (shown in phantom at V1, V2) may be used to divert fluid flow from the fluid line L through the fluid monitoring module 1000. The upstream sensor 1020 measures the pressure and/or temperature upstream of the flow restricting passage 1015, and the downstream sensor 1030 measures the pressure and/or temperature downstream of the flow restricting passage 1015. Corresponding signals are transmitted from the sensors 1020, 1030 to the controller 1050 for calculation and identification (e.g., through a user interface or communication of the data to a remote computer) of the pressure, temperature, flow rate, and/or other fluid conditions.

In still another embodiment, a portable fluid monitoring module may be provided without fluid components (e.g., ports, connectors, passages), and with a wireless transceiver for communicating wirelessly with one or more fluid sensors integrated into the fluid line of a system, such that an operator may perform a fluid monitoring operation at one or more locations in a fluid system by bringing the portable fluid monitoring module into proximity with the integrated fluid sensor(s).

Figure 22:
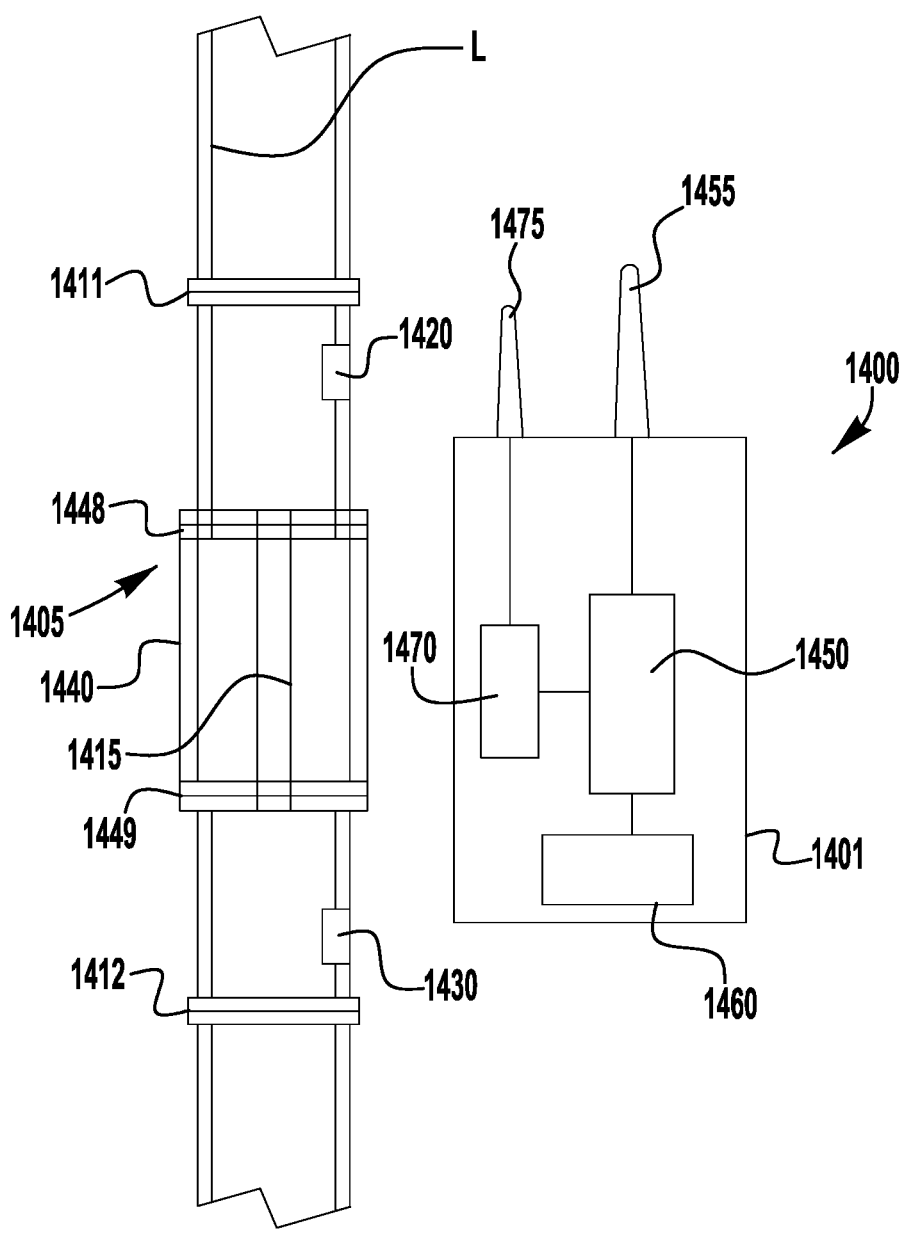
FIG. 22 is a schematic view of another fluid system with another portable fluid monitoring module, in accordance with another aspect of the present disclosure.

FIG. 22 illustrates an exemplary system including a fluid line L with an engineered flow restriction R (e.g., provided in a flow restricting coupling, valve, etc.), and a portable fluid monitoring module 1400. The fluid line L includes fluid sensors 1420, 1430 (which may be similar to the sensors described above) upstream and downstream of a flow restriction 1415. While the fluid sensors 1420, 1430 and flow restriction 1415 may be integrated into the fluid line L, in an exemplary embodiment, the fluid sensors and flow restriction may be provided in a separate flow sensing device 1405 including connectors 1411, 1412 (e.g., zero clearance fittings) configured to facilitate coupling and decoupling from the fluid line L. The flow restriction 1415 may be provided in a flow restricting element 1440 having connectors 1448, 1449 to facilitate removal of the flow restricting element from the flow sensing device 1405 (e.g., for maintenance or replacement with a different flow restricting element having different sizing and/or flow characteristics.

The fluid monitoring module 1400 includes a transceiver 1470 configured to wirelessly communicate (e.g., RFID, Bluetooth, NFC, or other such wireless communication), for example, through an antenna 1475, with the fluid sensors 1420, 1430, when the fluid monitoring module 1400 is in proximity with the sensors 1420, 1430. Wireless communication may be automatically initiated when in proximity (e.g., as a result of periodic query or ping transmissions by the transceiver), or by actuation of a button or other such user interface. The transceiver 1470 communicates received data signals corresponding to the fluid system (e.g., identification codes, upstream/downstream pressure, temperature, time stamp) to a controller 1450 in the module enclosure 1401. Similar to the exemplary embodiment of FIGS. 10A-13C, the module 1400 may additionally be provided with one or more of: one or more internal batteries 1460; a wireless transmitter (e.g., provided on a circuit board of the controller 1450) for wirelessly transmitting flow data to a remote device; an external antenna 1455, electrically connected with the controller transmitter, for enhanced wireless communication with a remote device; a user interface, such as, for example, one or more knobs, switches or buttons, for example, to turn on the controller, to turn off the controller, or to commission/synchronize the controller, and one or more display elements (e.g. indicator LEDs and/or display screen), as described in greater detail above.

In one embodiment, the fluid monitoring module 1400 may be a smart phone or other such portable computing device that may be provided with a software or web-based application configured to initiate communication with the sensors 1420, 1430, process the received data signals, display data related to the fluid system conditions, and/or transmit fluid data to a remote system.

According to another aspect of the present disclosure, a fluid monitoring module having a controller configured for communicating with an external device may be further configured to receive data transmissions from other proximate fluid system components for communication of properties and characteristics of these proximate fluid system components to an external device for tracking or monitoring. As one example, a portable sample cylinder selectively connected to a fluid system (e.g., for obtaining a grab sample for off-site laboratory analysis) may include communication circuitry (e.g., RFID tag) configured to communicate directly or indirectly with a fluid monitoring module of the fluid system when the sample cylinder is proximate to the fluid monitoring module. In one example, the fluid monitoring module may include or be connected with (e.g., by a wired or wireless connection) an RFID reader configured to initiate wireless communication (e.g., near field communication, Bluetooth® communication, or other such short range wired or wireless communication) with an RFID tag or transmitter provided with the sample cylinder when the sample cylinder is brought into range of the fluid monitoring module (e.g., by responding to a periodic query or ping from the reader). In other embodiments, communication between the RFID tag/transmitter and the RFID reader may be initiated by a user operated push button switch, or by a switch that is automatically activated when the sample cylinder is connected to the fluid system or when a valve is opened to fill the cylinder.

Figure 23:
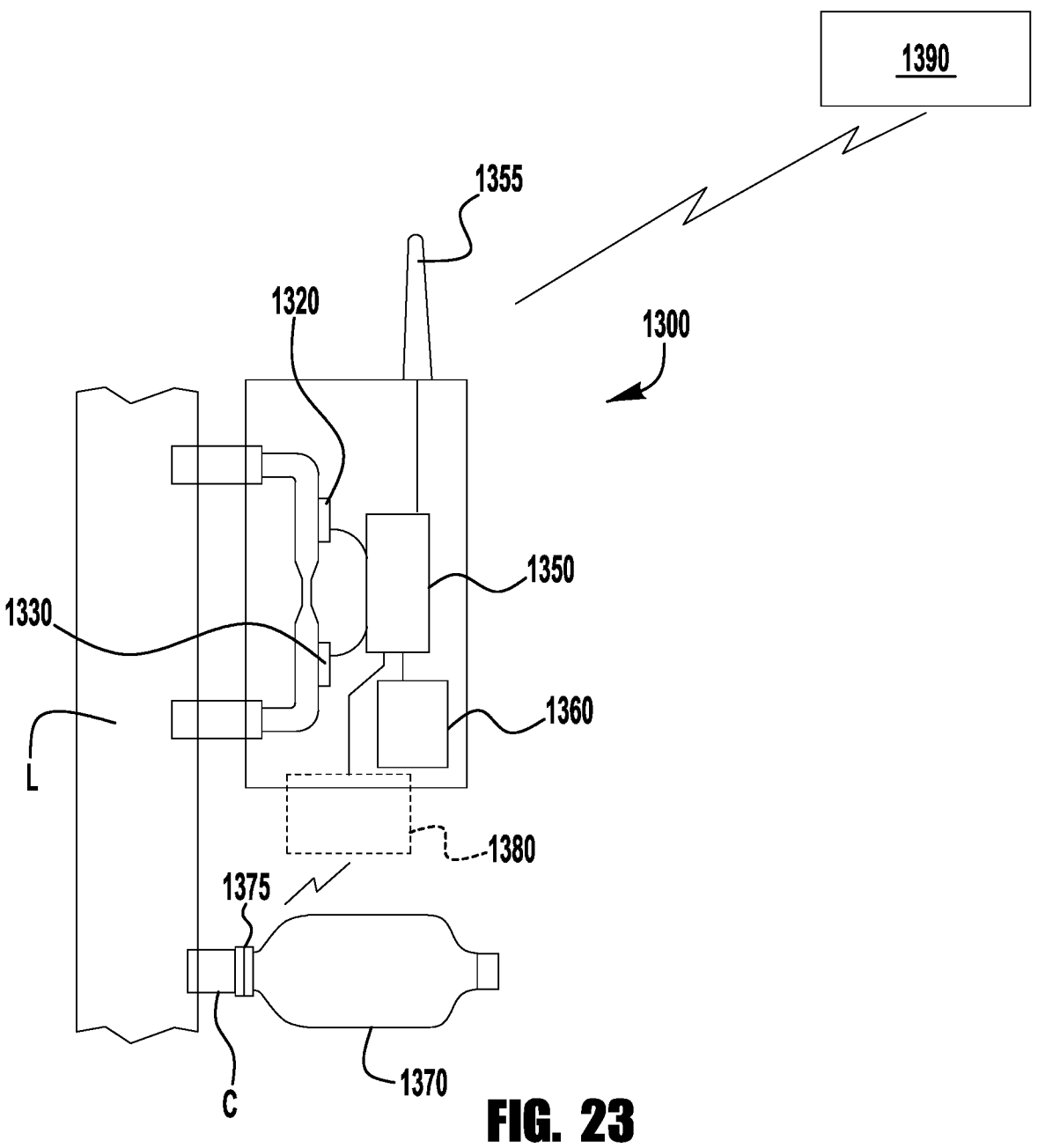
FIG. 23 is a schematic view of an exemplary fluid monitoring and grab sampling system, accordance with another aspect of the present disclosure.

FIG. 23 schematically illustrates an exemplary system including a fluid line L with which a fluid monitoring module 1300 (e.g., any of the fluid monitoring modules described herein) is installed. The fluid line L includes a branch connector C to which a sample cylinder 1370 may be connected (e.g., by a quick disconnect coupling connection), for example, for obtaining a grab sample of the fluid in the fluid line. The sample cylinder 1370 includes an RFID tag/transmitter 1375 for communicating data regarding the sample cylinder (e.g., serial/ID number, time stamp associated with time of connection to fluid line L) to an RFID reader 1380 provided with or connected to the fluid monitoring module 1300. The data received by the RFID reader 1380 may be communicated to the controller 1350 of the module 1300 (e.g., by a wired or wireless connection between the controller and the RFID reader) and compiled with other contemporaneous fluid system data collected by the controller (e.g., flow rate, pressure, temperature of fluid in the fluid line as measured by sensors 1320, 1330, serial/ID number of the module 1300), and wirelessly communicated via transmitter antenna 1355 to an external device, for example, via a wireless gateway 1390, as powered, for example, by module battery 1360. Such an arrangement allows for real time tracking of a grab sampling operation without providing separate power and wireless transmission capability to the grab sample arrangement, by using the fluid monitoring module as a hub for such data collection and wireless communication.

In other applications, other data may be collected and communicated via the fluid monitoring modules. For example, operator identification data (e.g., as collected from a user ID RFID tag) and an associated timestamp may be transmitted to the controller when one or more operations are performed, such as, for example, grab sampling, maintenance, system shutoff, etc.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof

We claim:

1. A fluid monitoring module comprising
an enclosure;
a fluid sensing device assembled with the enclosure, the fluid sensing device including:
a body member defining a fluid port external to the enclosure and a male threaded sensor port mounted to the enclosure and extending laterally into the enclosure;

a female threaded nut assembled with the sensor port;
a fluid sensor installed in the sensor port; and
a retaining collar having a neck portion extending into the sensor port in engagement with the fluid sensor and a head portion captured between the female threaded nut and an end face of the sensor port; and
a controller disposed within the enclosure and in circuit communication with the fluid sensor for receiving at least one of pressure indicating signals and temperature indicating signals from the fluid sensor, and for measuring fluid data based on the received signals; and
wherein the fluid sensor is connected with the controller by wiring extending through a central bore in the retaining collar.

2. The fluid monitoring module of claim 1, further comprising a panel nut threaded with the male threaded sensor port and against the enclosure.

3. The fluid monitoring module of claim 1, wherein the fluid sensing device is a first fluid sensing device, the fluid monitoring module further comprising a second fluid sensing device assembled with the enclosure, wherein the controller is in circuit communication with a second fluid sensor of the second fluid sensing device for receiving at least one of pressure indicating signals and temperature indicating signals from the fluid sensor, and for measuring fluid data based on the received signals.

4. The fluid monitoring module of claim 3, wherein the second fluid sensing device further includes:
a second body member defining a second fluid port external to the enclosure and a second male threaded second sensor port mounted to the enclosure and received through a second mounting aperture in the enclosure to extend into the enclosure, with the second fluid sensor installed in the second sensor port;
a second female threaded nut assembled with the second sensor port;
and
a second retaining collar having a second neck portion extending into the second sensor port in engagement with a surface on an outer peripheral portion of the second fluid sensor and a second head portion captured between the second female threaded nut and an end face of the second sensor port.

5. The fluid monitoring module of claim 4, wherein the second body member and the body member of the first fluid sensing device each include an axially extending connecting port, with the connecting port of the first fluid sensing device extending toward the connecting port of the second fluid sensing device.

6. The fluid monitoring module of claim 4, wherein the second fluid port and the fluid port of the first fluid sensing device extend laterally away from the enclosure.

7. The fluid monitoring module of claim 5, further comprising a blind coupling member having a first end coupled to the connecting port of the first fluid sensing device and a second end coupled to the connecting port of the second fluid sensing device.

8. The fluid monitoring module of claim 5, further comprising a flow restricting element defining a flow restricting passage and including a first end connection coupled to the connecting port of the first fluid sensing device and a second end connection coupled to the connecting port of the second fluid sensing device.

9. The fluid monitoring module of claim 8, wherein the first and second end connections comprise zero clearance connectors that provide for removal and reinstallation of the flow restricting element with the first and second fluid sensing devices without repositioning the connecting ports.

10. The fluid monitoring module of claim 9, wherein the zero clearance connectors each include a male threaded connector having an end face groove retaining an O-ring seal.

11. A fluid monitoring module comprising an enclosure;

first and second fluid sensing devices assembled with the enclosure, each including a body member defining a fluid port external to the enclosure and a male threaded sensor port mounted to the enclosure and extending laterally into the enclosure, a female threaded nut assembled with the corresponding sensor port, a fluid sensor installed in the corresponding sensor port, and a retaining collar having a neck portion extending into the corresponding sensor port in engagement with the corresponding fluid sensor and a head portion captured between the corresponding female threaded nut and an end face of the corresponding sensor port; and a controller disposed within the enclosure and in circuit communication with the fluid sensors of the first and second fluid sensing devices for receiving at least one of pressure indicating signals and temperature indicating signals from the fluid sensors of the first and second fluid sensing devices, and for measuring fluid data based on the received signals.

12. The fluid monitoring module of claim 11, wherein fluid ports of the first and second fluid sensing devices extend laterally away from the enclosure.

13. The fluid monitoring module of claim 11, wherein the body members of the first and second fluid sensing devices each include an axially extending connecting port, with the connecting port of the first fluid sensing device extending toward the connecting port of the second fluid sensing device.

14. The fluid monitoring module of claim 13, further comprising a blind coupling member having a first end coupled to the connecting port of the first fluid sensing device and a second end coupled to the connecting port of the second fluid sensing device.

15. The fluid monitoring module of claim 13, further comprising a flow restricting element defining a flow restricting passage and including a first end connection coupled to the connecting port of the first fluid sensing device and a second end connection coupled to the connecting port of the second fluid sensing device.

16. The fluid monitoring module of claim 15, wherein first and second end connections comprise zero clearance connectors that provide for removal and reinstallation of the flow restricting element with the first and second fluid sensing devices without repositioning the connecting ports.

17. The fluid monitoring module of claim 16, wherein the zero clearance connectors each include a male threaded connector having an end face groove retaining an O-ring seal.

18. A fluid monitoring module comprising:

an enclosure;

a fluid sensing device assembled with the enclosure, the fluid sensing device including:

a body member defining a fluid port external to the enclosure and a male threaded sensor port mounted to the enclosure and received through a mounting aperture in the enclosure to extend into the enclosure;

a female threaded nut assembled with the sensor port;

a fluid sensor installed in the sensor port; and a retaining collar having a neck portion extending into the sensor port in engagement with a radial surface on an outer peripheral portion of the fluid sensor to secure the outer peripheral portion of the fluid sensor between the neck portion and a counterbore portion of the sensor port, and a head portion extending radially outward of the neck portion and captured between the female threaded nut and an end face of the sensor port; and a controller disposed within the enclosure and in circuit communication with the fluid sensor for receiving at least one of pressure indicating signals and temperature indicating signals from the fluid sensor, and for measuring fluid data based on the received signals.

19. The fluid monitoring module of claim 18, further comprising a panel nut threaded with the male threaded sensor port and against the enclosure.

20. The fluid monitoring module of claim 18, wherein the fluid sensor is connected with the controller by wiring extending through a central bore in the retaining collar.

21. The fluid monitoring module of claim 18, wherein the fluid sensing device is a first fluid sensing device, the fluid monitoring module further comprising a second fluid sensing device assembled with the enclosure, wherein the controller is in circuit communication with a second fluid sensor of the second fluid sensing device for receiving at least one of pressure indicating signals and temperature indicating signals from the second fluid sensor, and for measuring fluid data based on the received signals.

* * * * *